United States Patent [19]
Nakahashi

[11] 4,403,837
[45] Sep. 13, 1983

[54] OBJECTIVE FOR ENDOSCOPES

[75] Inventor: Ken-ichi Nakahashi, Hachiouji, Japan

[73] Assignee: Olympus Optical Co., Ltd., Tokyo, Japan

[21] Appl. No.: 309,410

[22] Filed: Oct. 7, 1981

[30] Foreign Application Priority Data

Oct. 8, 1980 [JP] Japan .................. 55-139904

[51] Int. Cl.³ .................. G02B 5/16; G02B 9/60
[52] U.S. Cl. .................. 350/465; 350/450; 350/96.26
[58] Field of Search .................. 350/465, 450, 96.26

[56] References Cited
U.S. PATENT DOCUMENTS 3,410,632  11/1968  Woltche .................. 350/450
4,059,344  11/1977  Yamasita .
4,269,485   5/1981  Yamashita et al. .................. 350/96.26

FOREIGN PATENT DOCUMENTS 625180  9/1978  U.S.S.R. .................. 350/96.26

Primary Examiner—John K. Corbin
Assistant Examiner—Rebecca D. Gass
Attorney, Agent, or Firm—Cushman, Darby & Cushman

[57] ABSTRACT

An objective for endoscopes comprising a first, second, third, fourth and fifth lens components in which the first lens component is a negative meniscus lens having a convex surface on the object side, the second lens component is a positive meniscus lens having a concave surface on the object side, the third lens component is a positive lens, the fourth lens component is a cemented lens consisting of a positive lens element and a negative lens element cemented to said positive lens element, and the fifth lens component is a positive lens, the objective for endoscopes having a very wide angle of view and well corrected aberrations.

14 Claims, 23 Drawing Figures

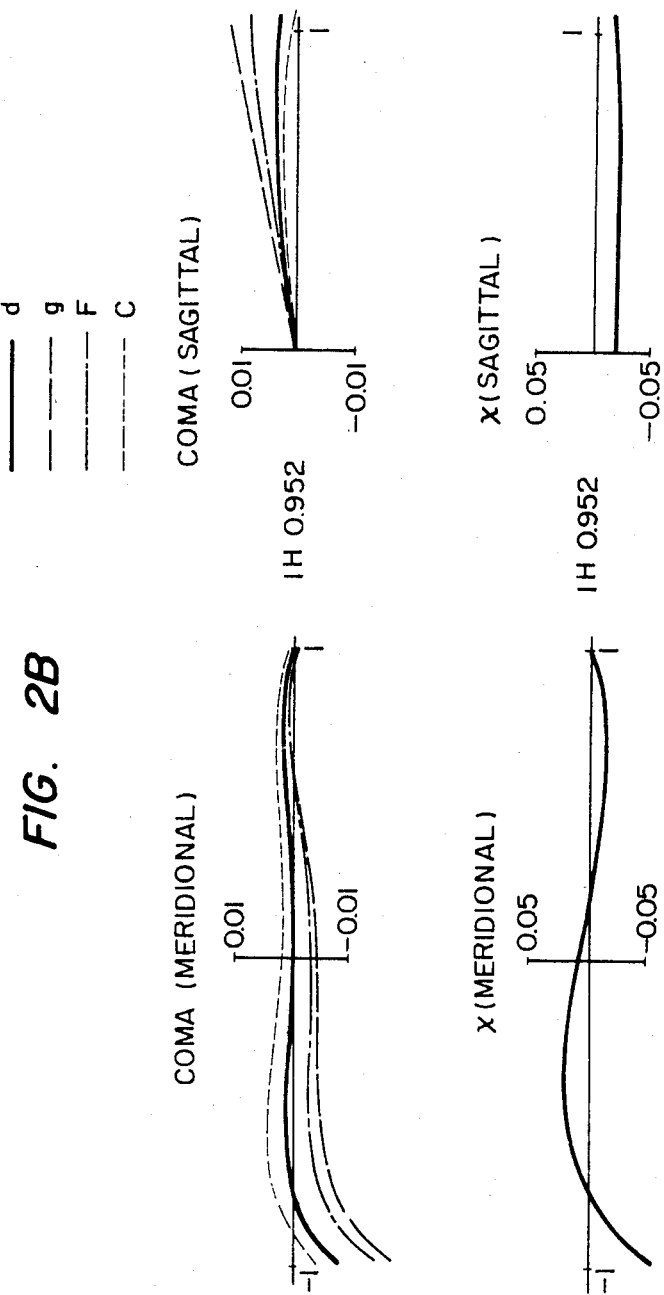

FIG. 3B
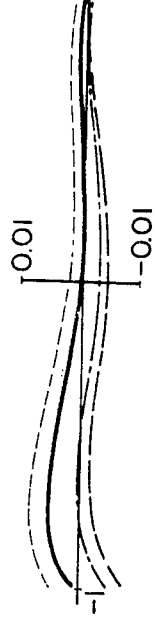
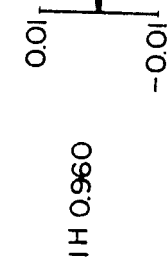
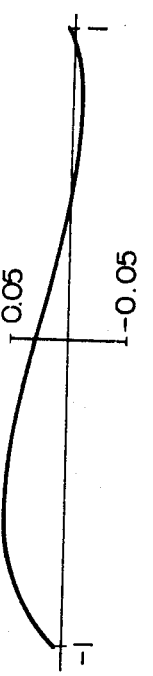
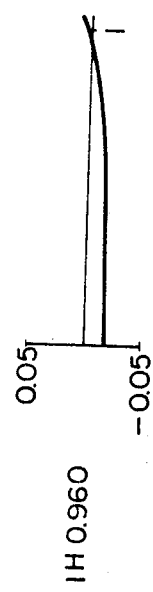

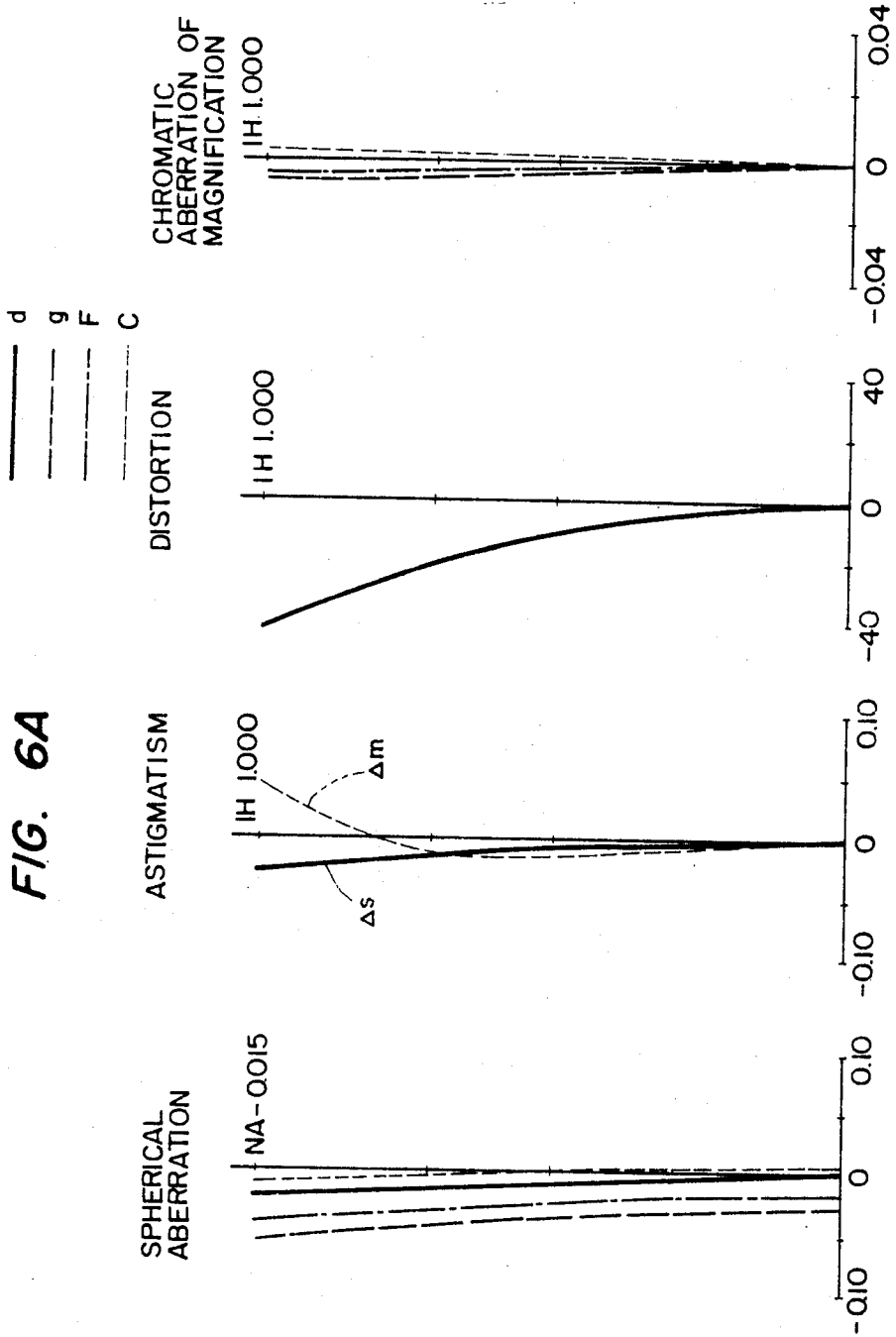

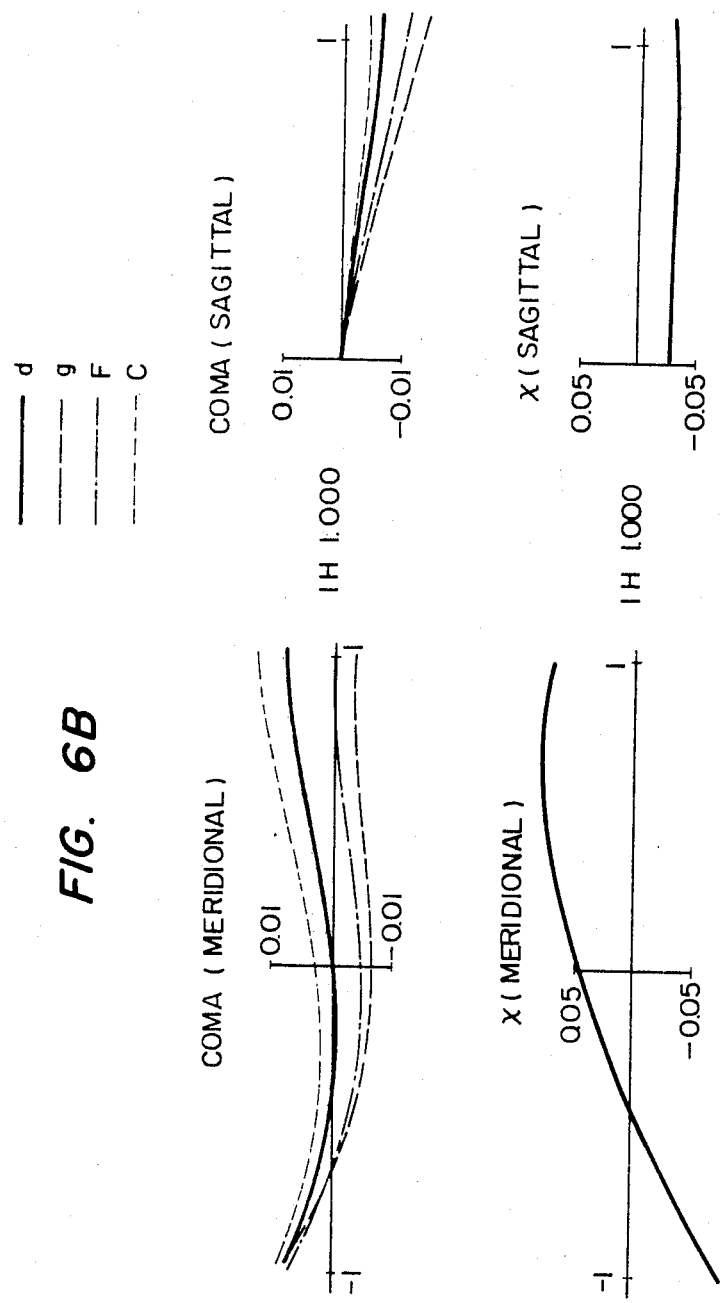

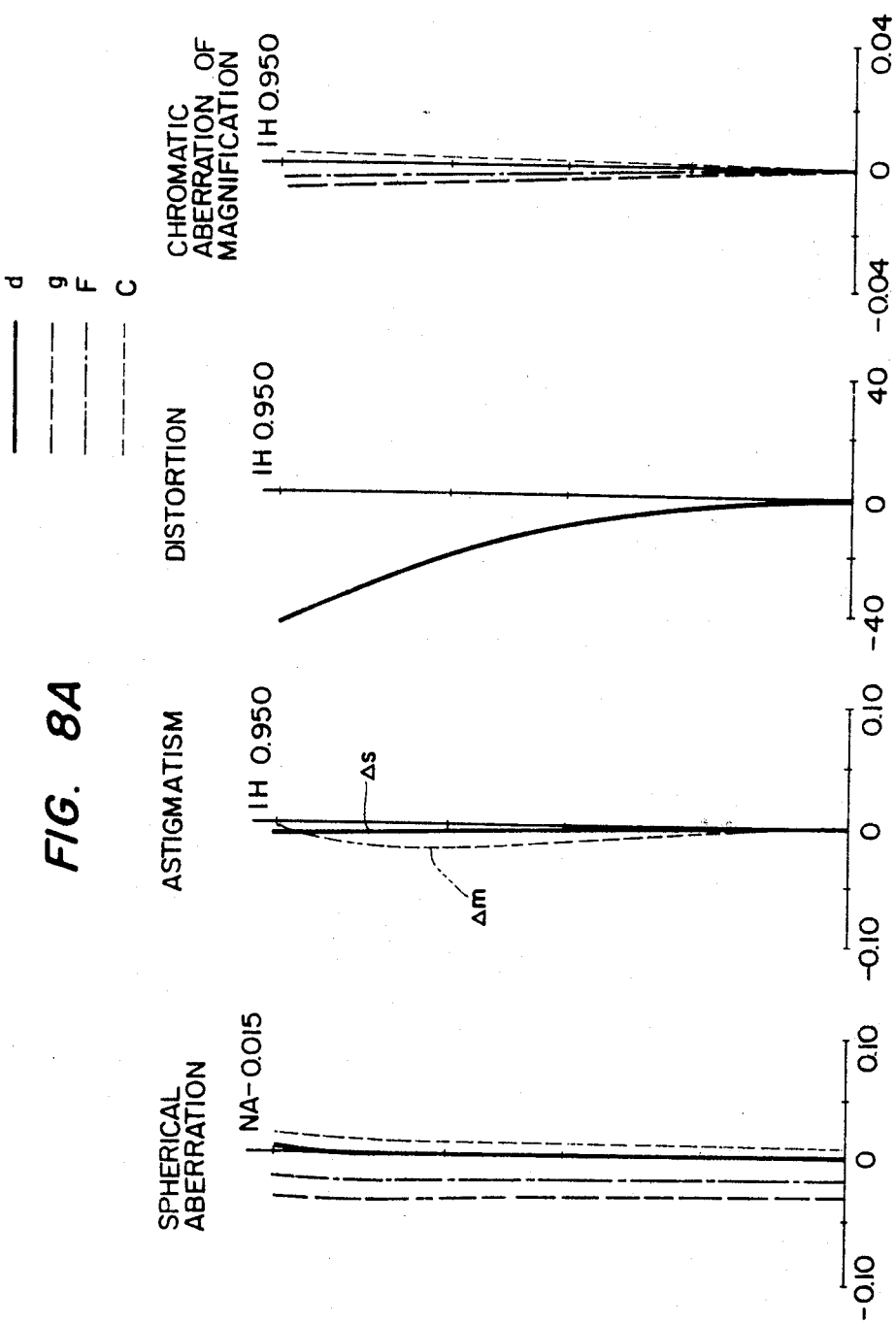

FIG. 8B
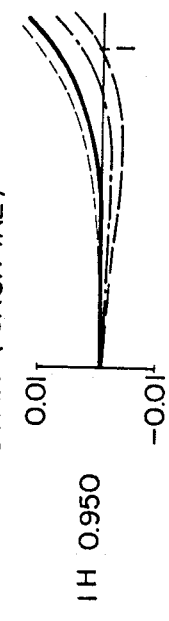
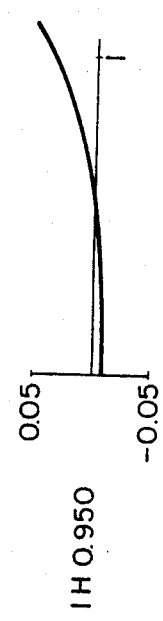
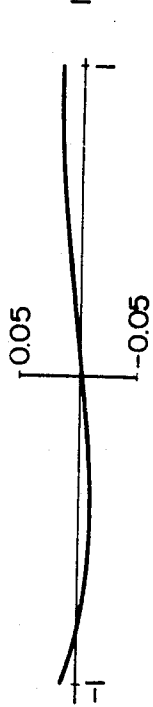

FIG. 10B
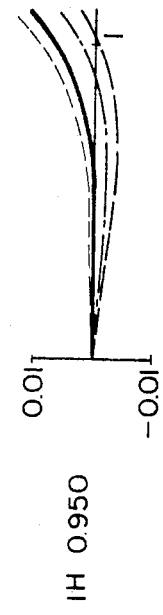
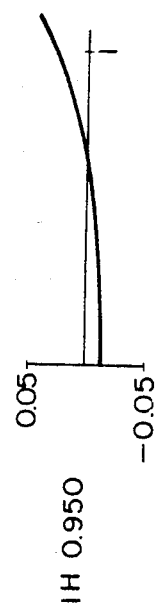
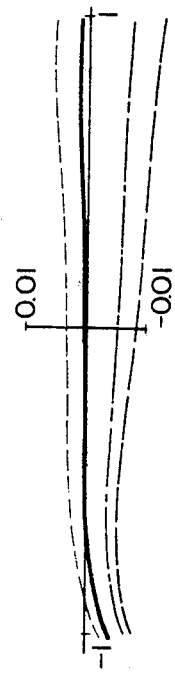
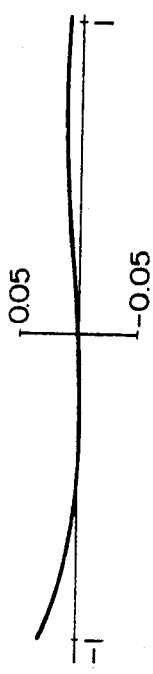

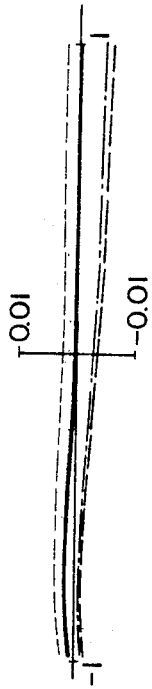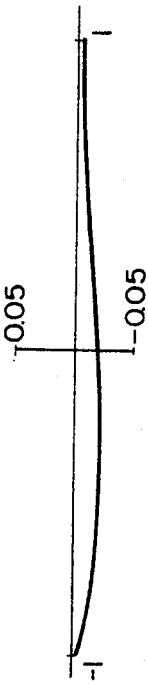
FIG. 11B

OBJECTIVE FOR ENDOSCOPES

BACKGROUND OF THE INVENTION (a) Field of the Invention

This invention relates to an objective for endoscopes and more particularly to an objective for endoscopes having a wide angle of view.

(b) Description of the Prior Art

In the examination with an endoscope, it is necessary to decrease the overlooking of a part affected by a disease. For that purpose, it is required to use an objective of a wide angle of view for the endoscope. However, the conventional objective for endoscopes is of an angle of view $2\omega$ of about 100 degrees at most and could be hardly said to be satisfactory.

SUMMARY OF THE INVENTION

An object of the present invention is to provide an objective for endoscopes having a very wide angle of view and well corrected aberrations in order to decrease the fear of overlooking a part affected by a disease and to make it possible to positively carry out a perfect examination.

As shown in FIG. 1, the objective for endoscopes according to the present invention comprises a first lens component of a negative meniscus lens having a convex surface on the object side, a second lens component of a positive meniscus lens having a concave surface on the object side, a third lens component of a positive lens, a fourth lens component of a cemented lens of a positive lens element and negative lens element and a fifth lens component of a positive lens and is arranged so as to satisfy the following respective conditions:

(1) $r_3 \leq -3f$
(2) $-1.5 \leq r_6/r_7 \leq -0.5$
(3) $-4f \leq r_6 \leq -1.0f$
(4) $-3.0f < r_4 < -0.8f$
(5) $1.0f < |r_8| < 2.5f$
(6) $|n_4 - n_5| > 0.1$ wherein reference symbols $r_3$, $r_4$, $r_6$, $r_7$ and $r_8$ represent radii of curvature respectively of both surfaces of the second lens component, the surface on the image side of the third lens component and the surface on the object side and the cemented surface of the fourth lens component, reference symbols $n_4$ and $n_5$ represent respective refractive indices of both lens elements of the fourth lens component, and reference symbol f represents a focal length of the entire system.

In the lens system of the present invention, the concave meniscus lens with the convex surface directed toward the object side is arranged as the first lens component in order to make the angle of view so wide as to be about 120 degrees. Further, by making the first lens component as mentioned above, the light pencil incident upon the optical system arranged on the rear side of this lens component (that is, the side opposite the object) can be made small and the diameter of the second, third, fourth and fifth lens components can be made small. Further, by making the first lens component the negative lens having a large curvature, concave surface the Petzval's sum can be made small and thereby, even with a wide angle of about 120 degrees, the curvature of field can be corrected.

Now, the second lens component is made the meniscus lens with the concave surface directed toward the object side in order to correct the spherical aberration. In order to correct the spherical aberration, the radius of curvature $r_3$ of the surface on the object side of this lens must satisfy the condition (1). If $r_3 > -3f$ by deviating from this condition (1), the bulging of the spherical aberration will become large.

Then, the third lens component is made the lens convex on both surfaces in order to correct the insufficiently corrected astigmatism generated because the first lens component is made the negative meniscus lens having a large curvature concave surface and to correct the spherical aberration. This third lens component is particularly effective to the lens system of the type in which a negative meniscus lens of having a large curvature concave surface is used for the first lens component in order to made the angle of view large as in the lens system of the present invention. Further, it is necessary to have the surface on the image side of this third lens component satisfying the condition (2) in the relation of it with the surface on the object side of the fourth lens component. Further, the radius of curvature $r_6$ of the surface on the image side of the third lens component must satisfy the condition (3). These conditions (2) and (3) are conditions required to make the bulging of the spherical aberration small and to well correct the coma of the offaxial ray. Particularly, satisfying the condition (2) is effective to prevent the offaxial coma from becoming asymmetrical with respect to the upper ray. That is to say, if $r_6/r_7$ is not more than the lower limit of $-1.5$, the offaxial lateral aberration of the part outside the principal ray of the offaxial light pencil will become negative and, if $r_6/r_7$ is not less than $-0.5$, the offaxial lateral aberration will become positive. In either case, the symmetry of the coma will break. The condition (3) shows that $r_6$ is always of a negative value. This is because the surface on the image side of the third lens component is made to be of such shape as directs the concave surface toward the stop arranged between the first lens component and second lens component in the same manner as of the surface on the object side of the second lens component so that the effect of correcting the respective aberrations is sufficiently obtained and the offaxial light pencil becomes symmetrical. However, when $r_6$ is not more than the lower limit of $-4.0f$ of the condition (3), the effect of making the surface on the image side of the third lens component concave with respect to the stop will become less and the symmetry will break. When $r_6$ is not less than $-1.0f$, the same in the explanation of the condition (1), the bulging on the peripheral portion of the spherical aberration will become large and, as a result, the respective aberrations will become hard to balance. Further, also with respect to the second lens component, for the same reason as in the explanation of the condition (3), it is necessary that the radius of curvature $r_4$ of the surface on the image side should satisfy the condition (4). If $r_4$ deviates from the lower limit of $-3.0f$ of the condition, the symmetry of the offaxial light pencil will break and, if it deviates from the upper limit of $-0.8f$, the bulging on the peripheral portion of the spherical aberration will become large and the respective aberrations will become hard to balance. By the way, the surface on the image side of the second lens component is nearer to the stop than the surface on the image side of the third lens component and is therefore more effective. Therefore, the conditions (3) and (4) are different from each other in the limiting range.

The fourth lens component is effective mostly to the correction of the chromatic aberration and the correction of the higher order axial and offaxial lateral aberrations. Therefore, for the correction of the chromatic aberration, the radius of curvature $r_8$ of the cemented surface of the fourth lens component is made to satisfy the condition (5) and the refractive indices $n_4$ and $n_5$ of both lenses forming the fourth lens component are made to satisfy the condition (6). These conditions are related with each other and are to correct and balance the axial chromatic aberration and the chromatic aberration of the magnification. If $|n_4-n_5|$ deviates from the range of the condition (6), the refracting power of the cemented surface will become so small that the chromatic aberration will not be able to be corrected. In the same manner, even if $|r_8|$ deviates from the upper limit of 2.5f of the condition (5), the refracting power of the cemented surface will become so small that the correction of the chromatic aberration will become difficult. If $|r_8|$ deviates from the lower limit of 1.0f, the refracting power of the cemented surface will be so strong that the chromatic aberration will be overcorrected.

Further, the condition (5) serves to correct not only the chromatic aberration but also the higher order axial and offaxial lateral aberrations. This is very effective to a lens system in which the angle of view is large as in the objective of the present invention and the number of lens components is not many as in the photographic lens. When the upper limit and lower limit of the condition (5) are exceeded, the above mentioned lateral aberrations will not be able to be corrected.

In case the endoscope objective is to be used as arranged in front of a glass fiber bundle, as in the later mentioned example of the present invention, it will be desirable to plane the surface on the image side of the fifth lens component and cement the lens component on this surface to the glass fiber bundle.

The fifth lens component of the objective of the present invention is a so-called field lens for making the ray or particularly the principal ray from the object side nearly parallel with the optical axis. As a characteristic of the glass fiber bundle, its permeability to a ray incident at a large angle is very low. Therefore, in the objective for endoscopes, the stop is located usually in the position of the front side focus of the entire group of the lens components located on the image side of the stop. However, when the stop is located in such position, a negative distortion will be generated. Particularly, in the case of such optical system of a large angle of view as the objective of the present invention, the negative distortion will become so large that the objective will not be able to endure the practical use as such for endoscopes. (By the way, the distortion thought to be no problem in practice is about −50%.) Therefore, in the present invention, the stop is positioned within a range in which the distortion is tolerable in practice and therefore a positive lens is arranged as the fifth lens component so that the angle of incidence of the ray upon the glass fiber bundle may be nearly zero.

In such objective of a large angle of view as in the present invention, the focal length is so short that the image forming position is near the lens system. If a field lens is arranged here, the image forming position will be so near to the lens surface that any damage or dirt on the lens surface will be seen. It is not desirable. Therefore, it is preferable to use a planoconvex lens for the fifth lens component and cement it on the plane side to the glass fiber bundle so that the damage or the like may not be conspicuous and the dirt or the like may be prevented from entering the system.

BRIEF DESCRIPTION OF THE DRAWINGS

FIG. 2A and FIG. 2B show curves illustrating the aberration characteristics of a first embodiment of the present invention;

FIG. 3A and FIG. 3B show curves illustrating the aberration characteristics of a second embodiment of the present invention;

FIG. 6A and FIG. 6B show curves illustrating the aberration characteristics of a fifth embodiment of the present invention;

FIG. 8A and FIG. 8B show curves illustrating the aberration characteristics of a seventh embodiment of the present invention;

FIG. 10A and FIG. 10B show curves illustrating the aberration characteristics of a ninth embodiment of the present invention;

FIG. 11A and FIG. 11B show curves illustrating the aberration characteristics of a tenth embodiment of the present invention.

DESCRIPTION OF THE PREFERRED EMBODIMENTS

Figure 1:
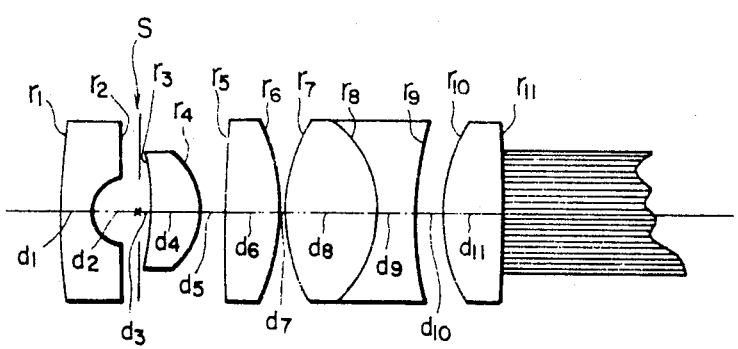
FIG. 1 shows a sectional view of the composition of the objective for endoscopes according to the present invention.
Figure 2A:
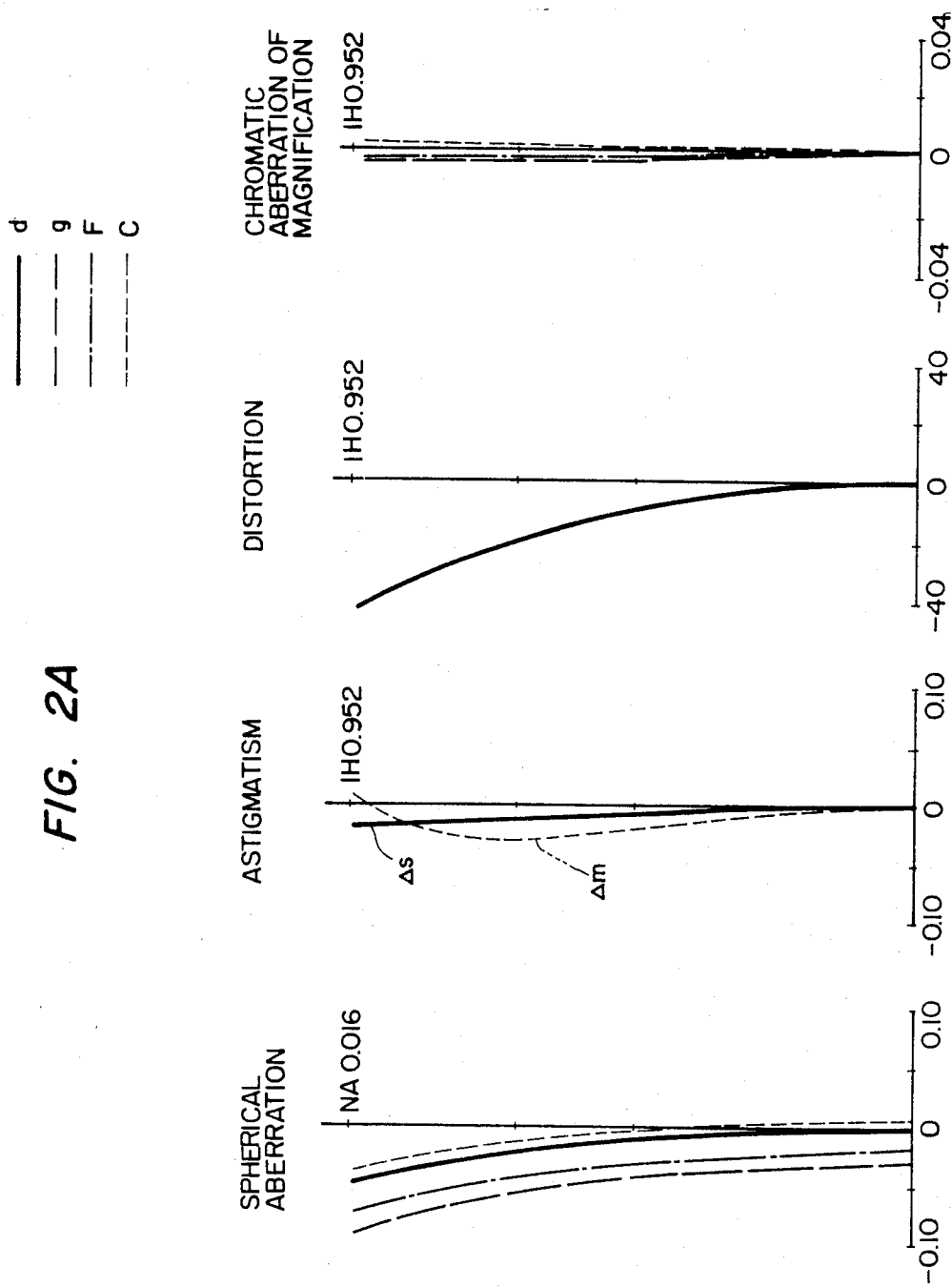
Figure 3A:
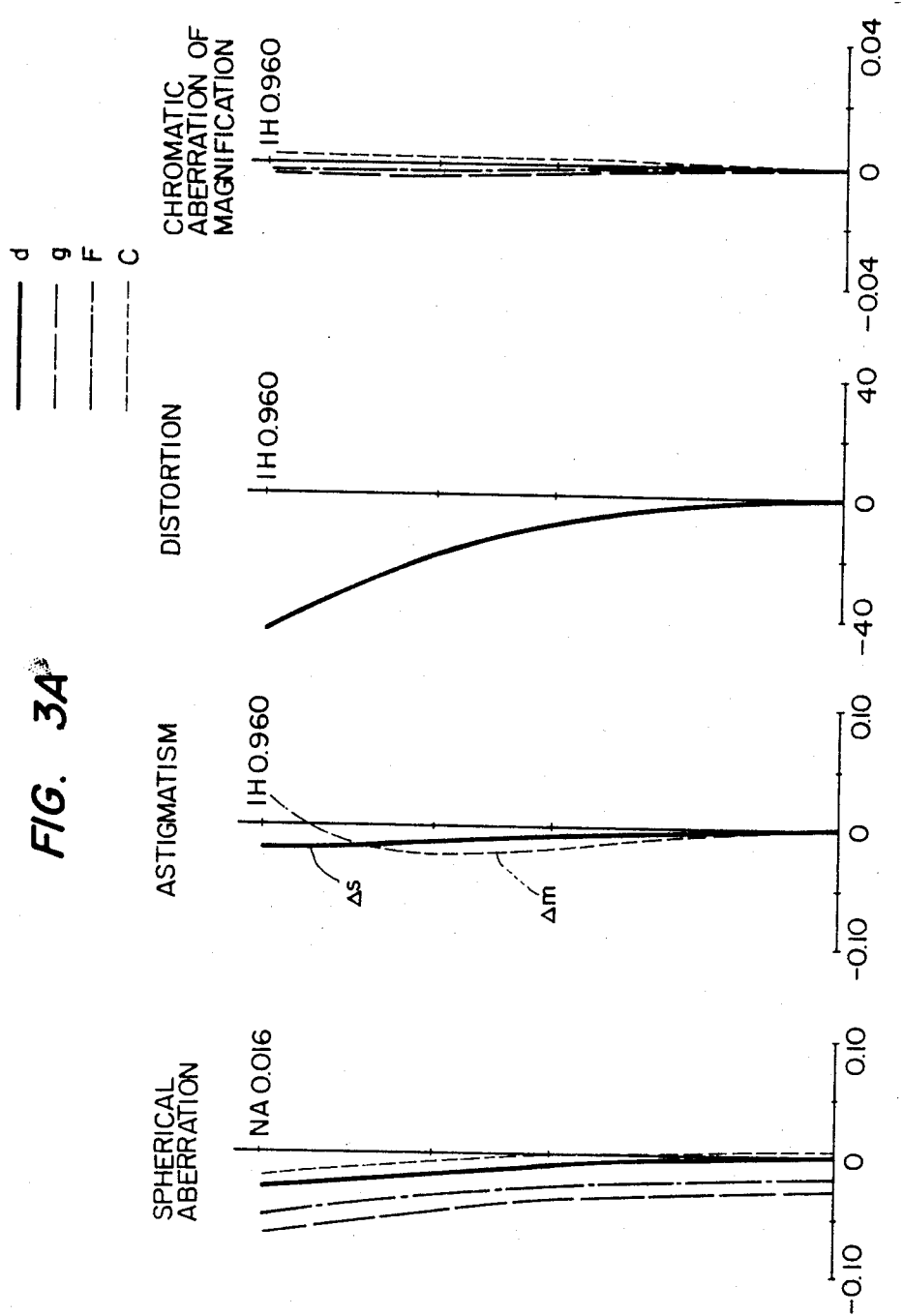
Figure 4A:
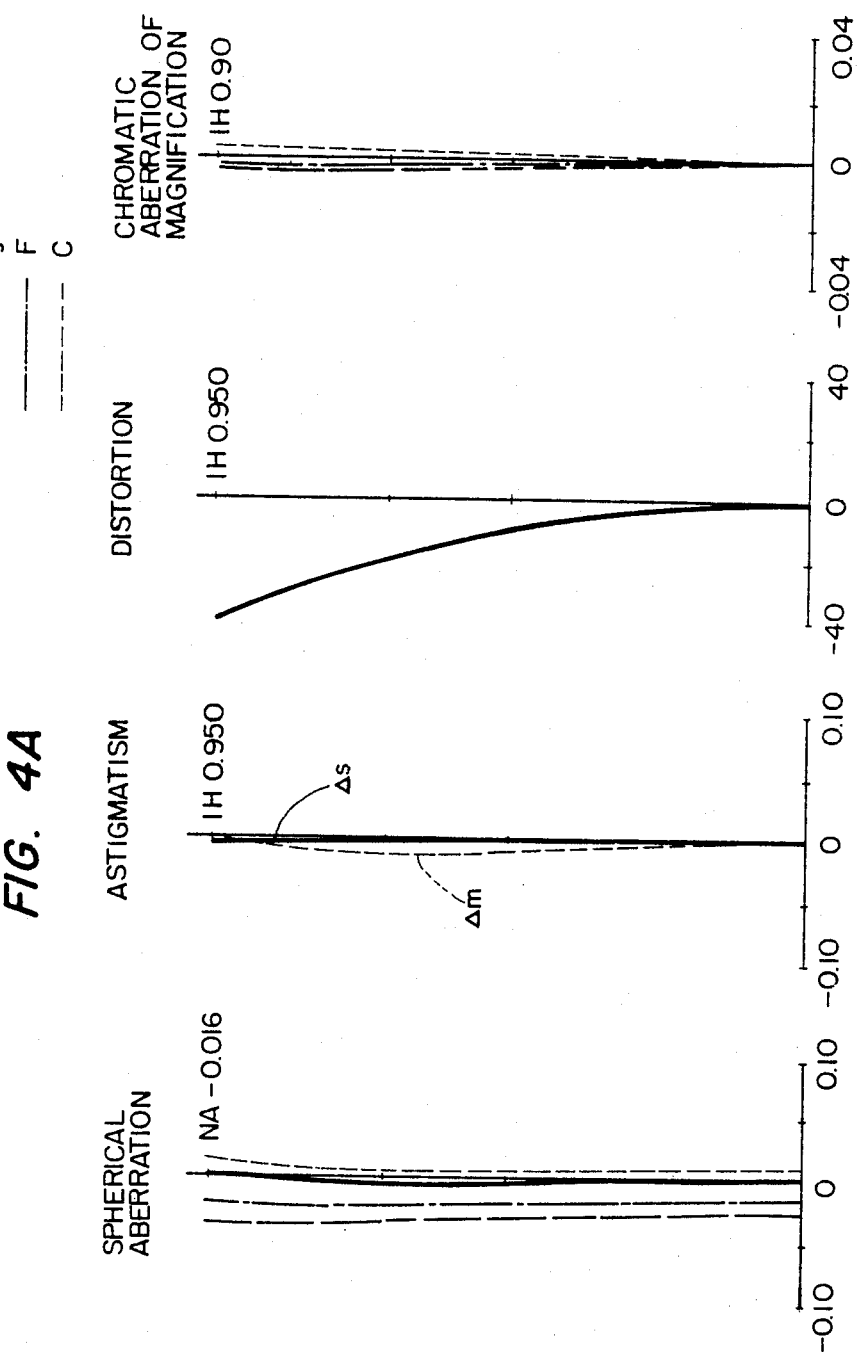
FIG. 4A and FIG. 4B show curves illustrating the aberration characteristics of a third embodiment of the present invention.
Figure 4B:
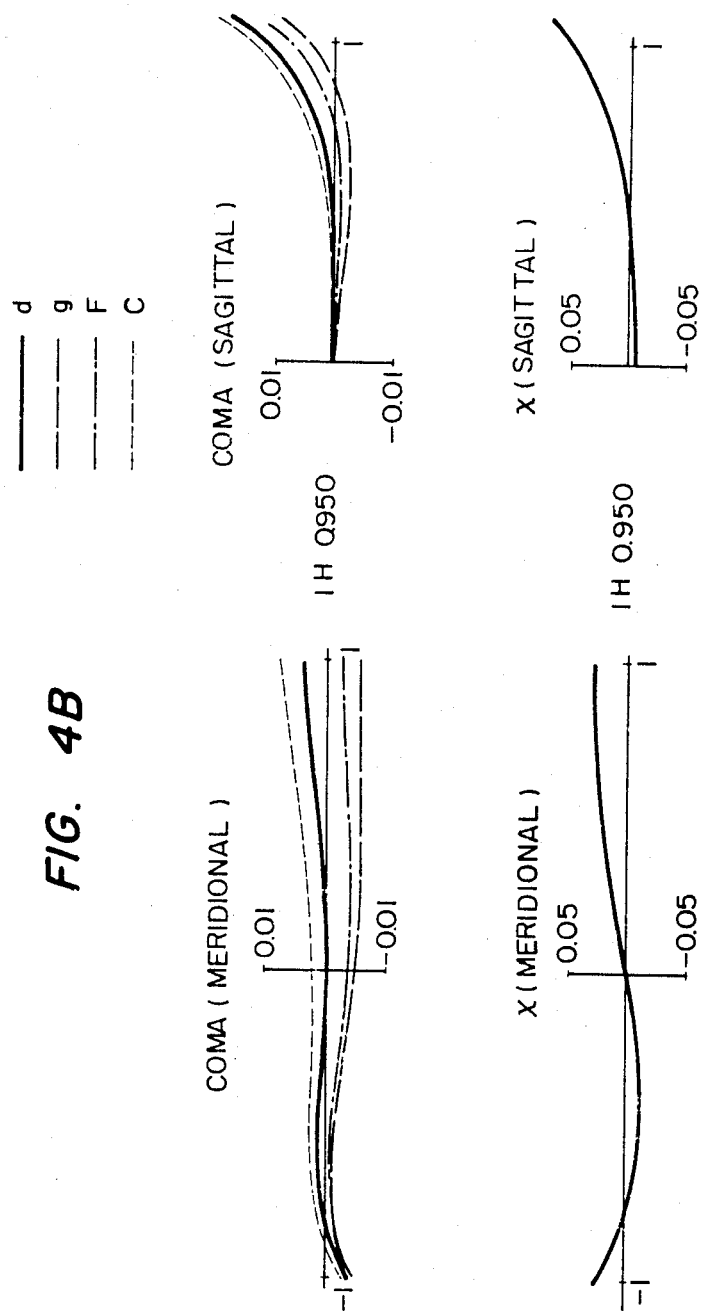
Figure 5A:
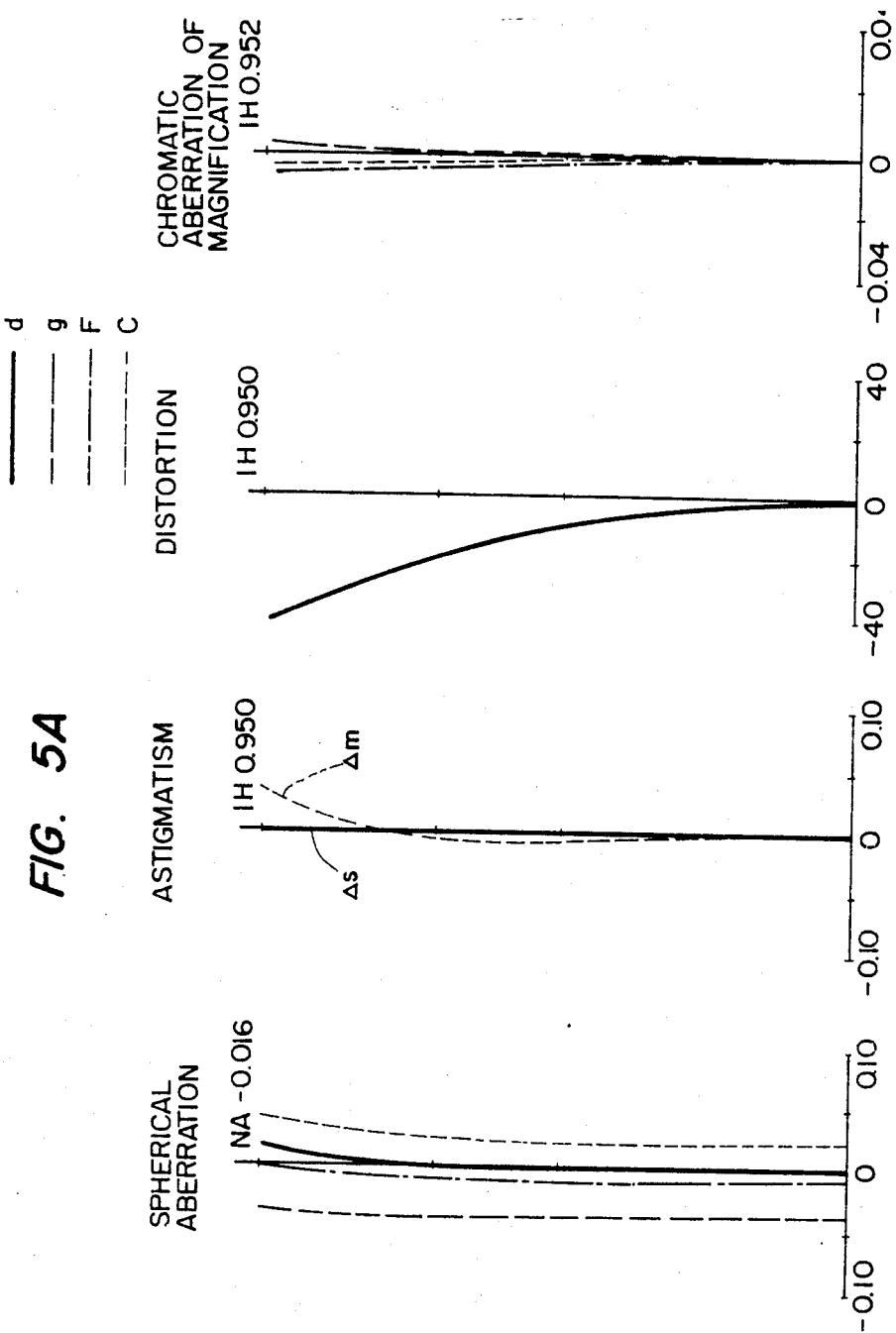
FIG. 5A and FIG. 5B show curves illustrating the aberration characteristics of a fourth embodiment of the present invention.
Figure 5B:
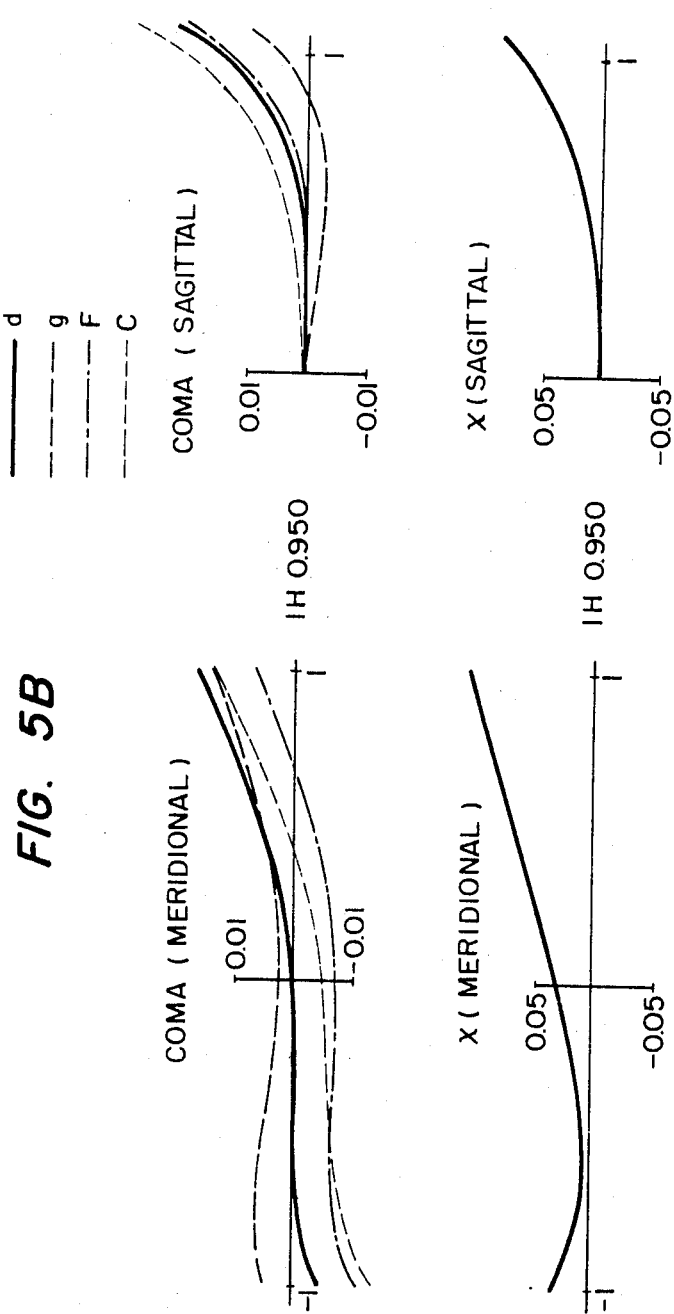
Figure 7A:
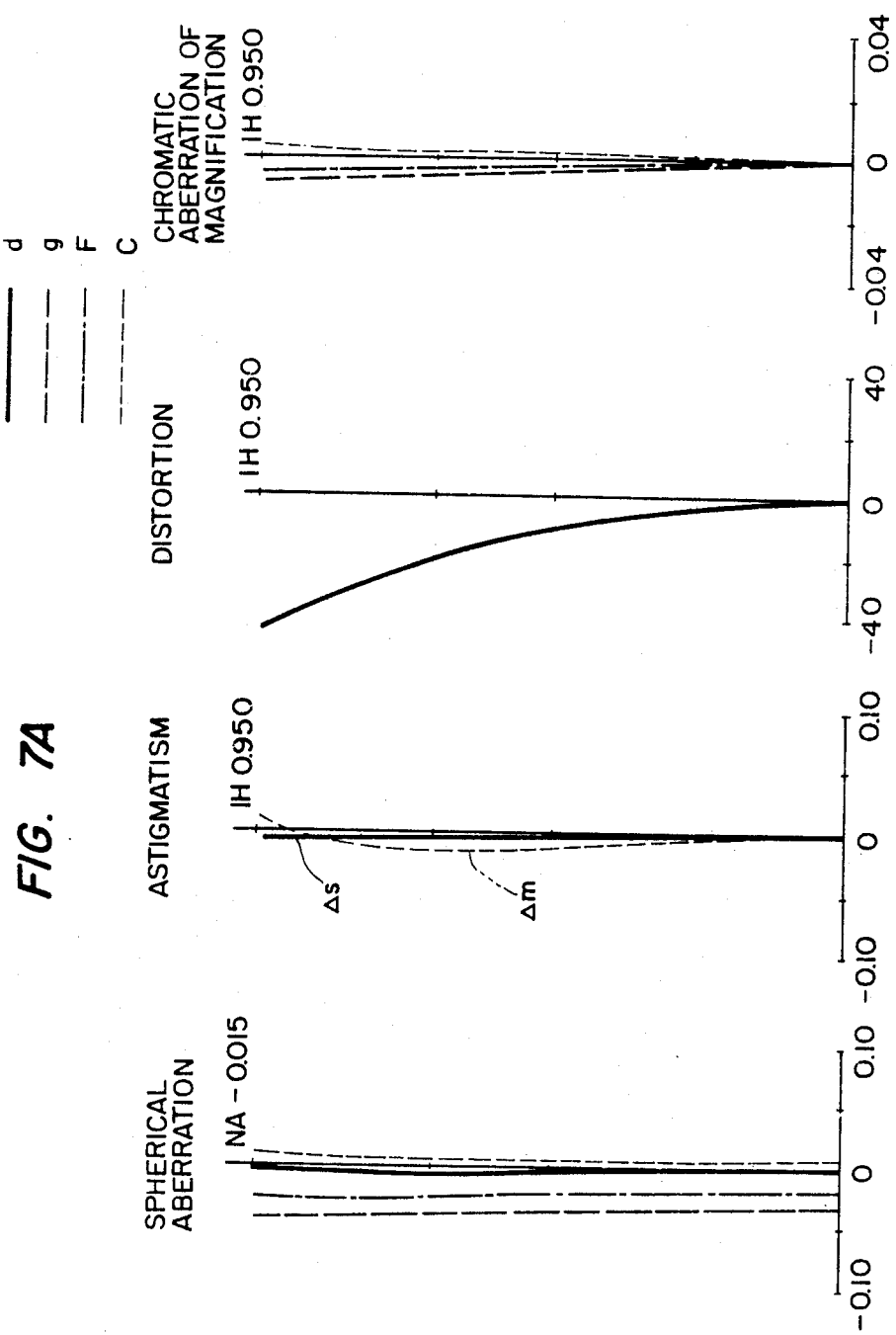
FIG. 7A and FIG. 7B show curves illustrating the aberration characteristics of a sixth embodiment of the present invention.
Figure 7B:
Figure 9A:
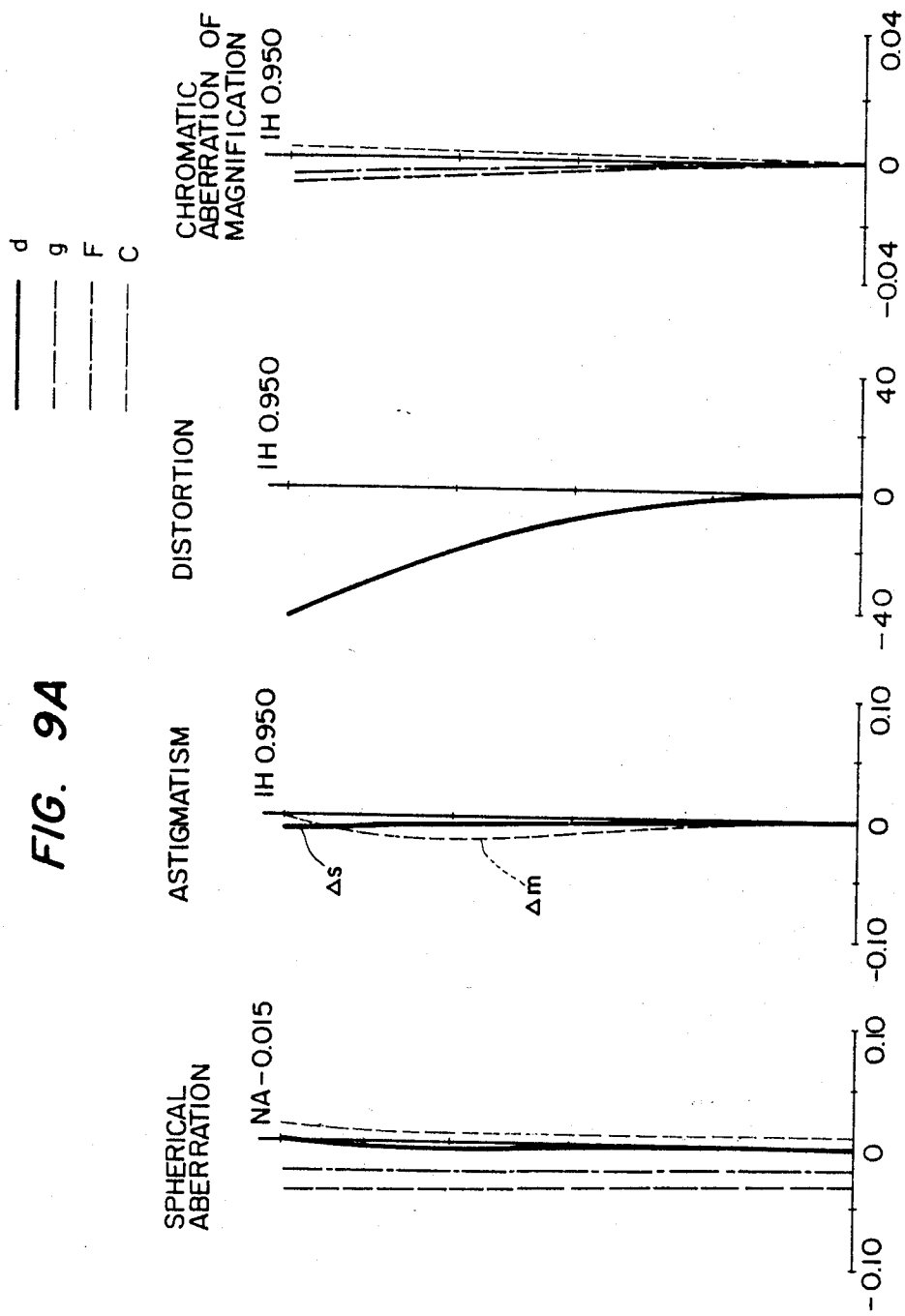
FIG. 9A and FIG. 9B show curves illustrating the aberration characteristics of an eighth embodiment of the present invention.
Figure 9B:
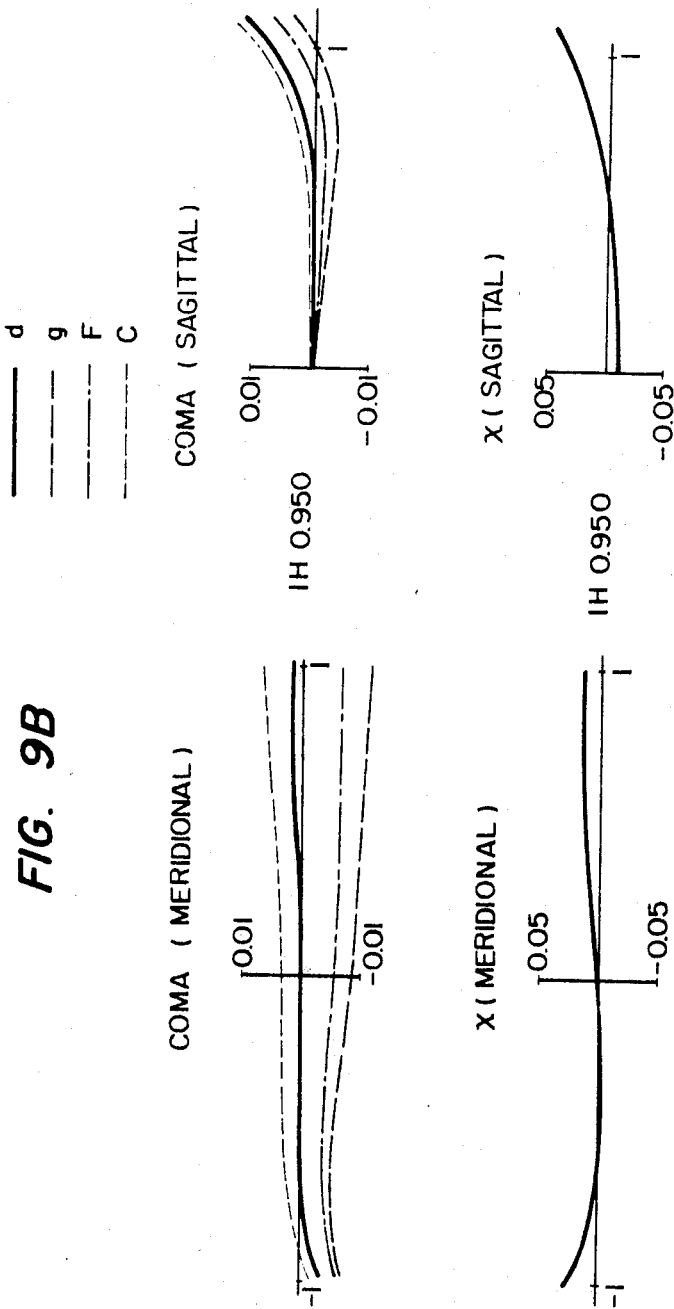
Figure 10A:
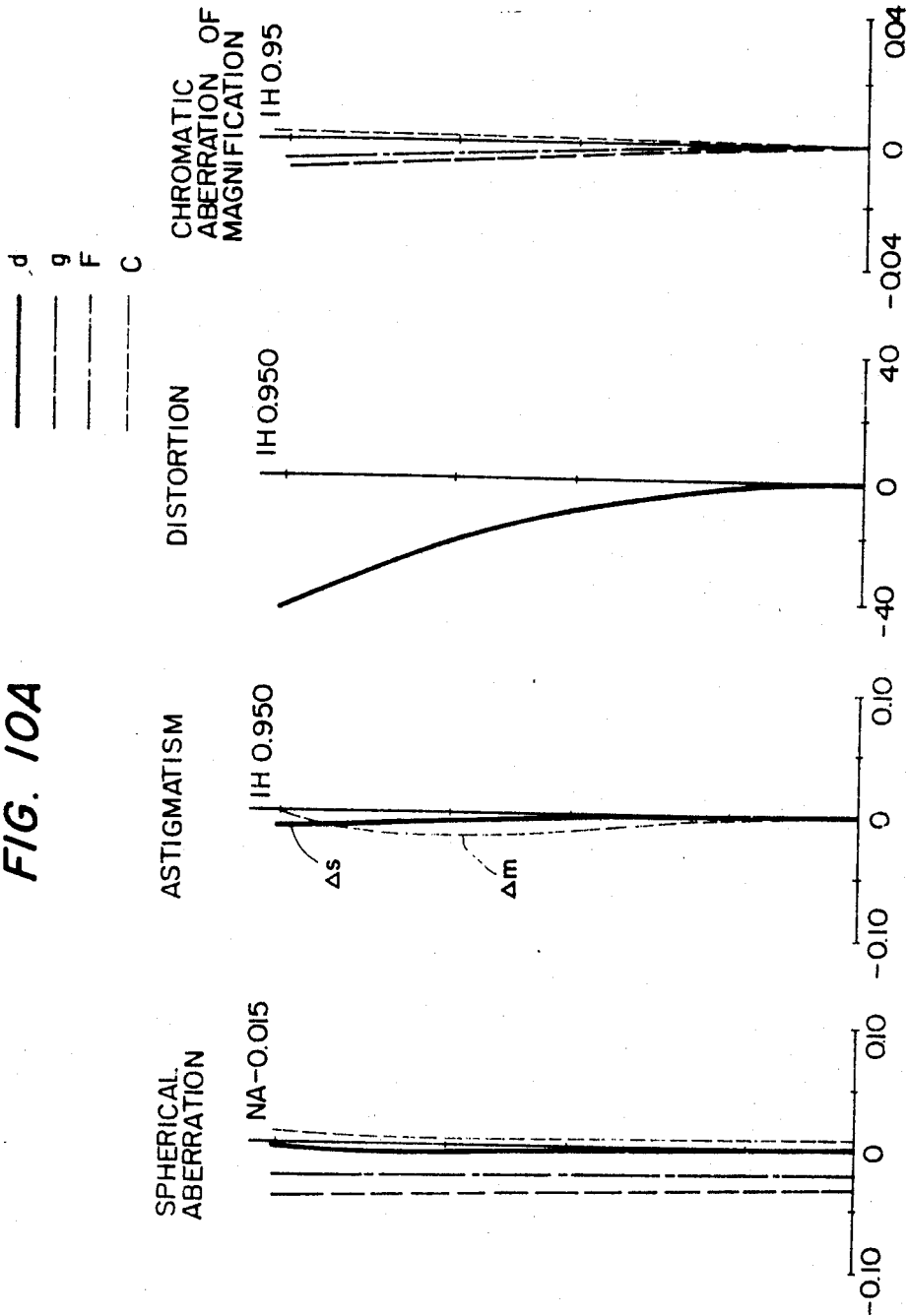
Figure 11A:
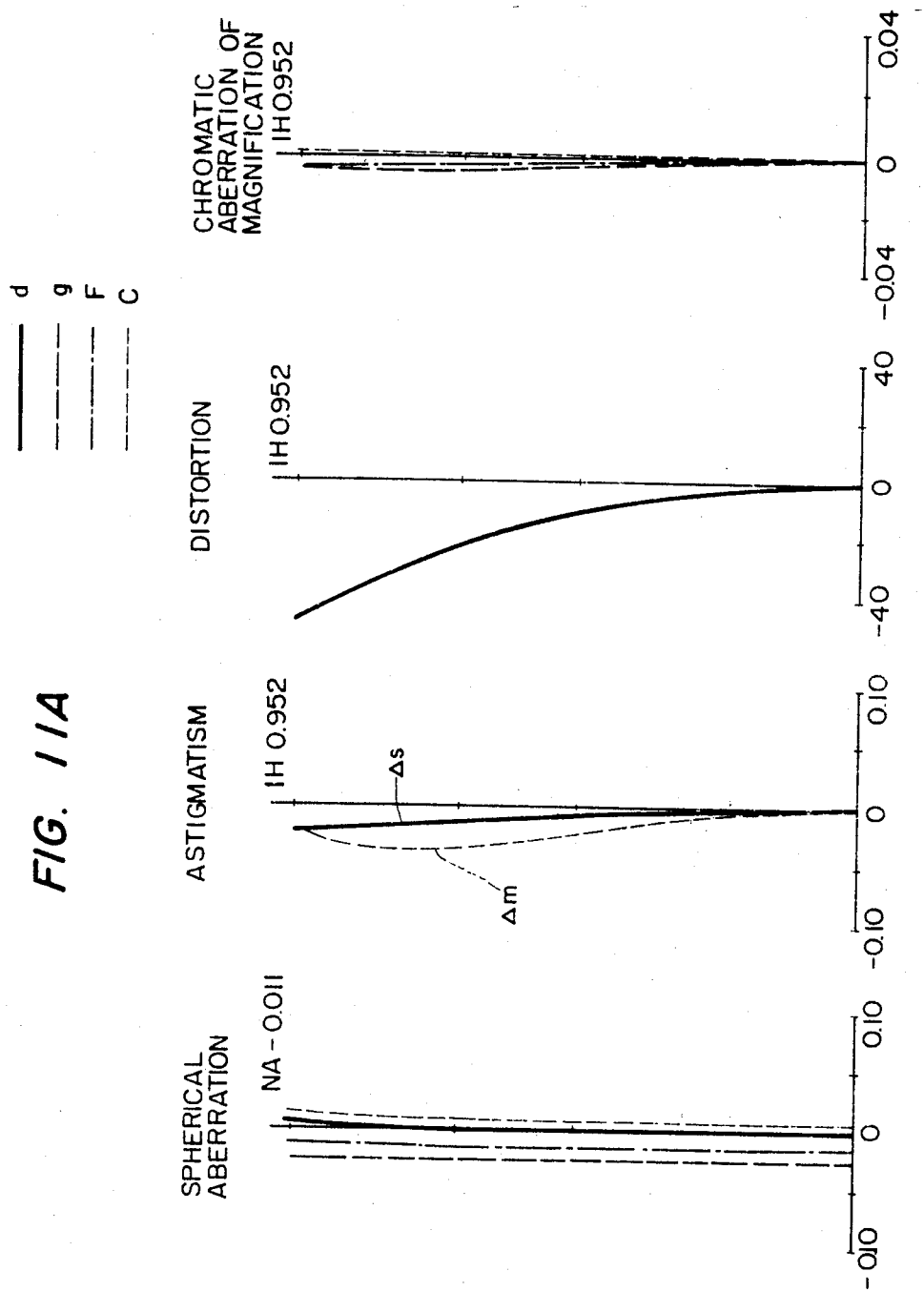
Figure 12A:
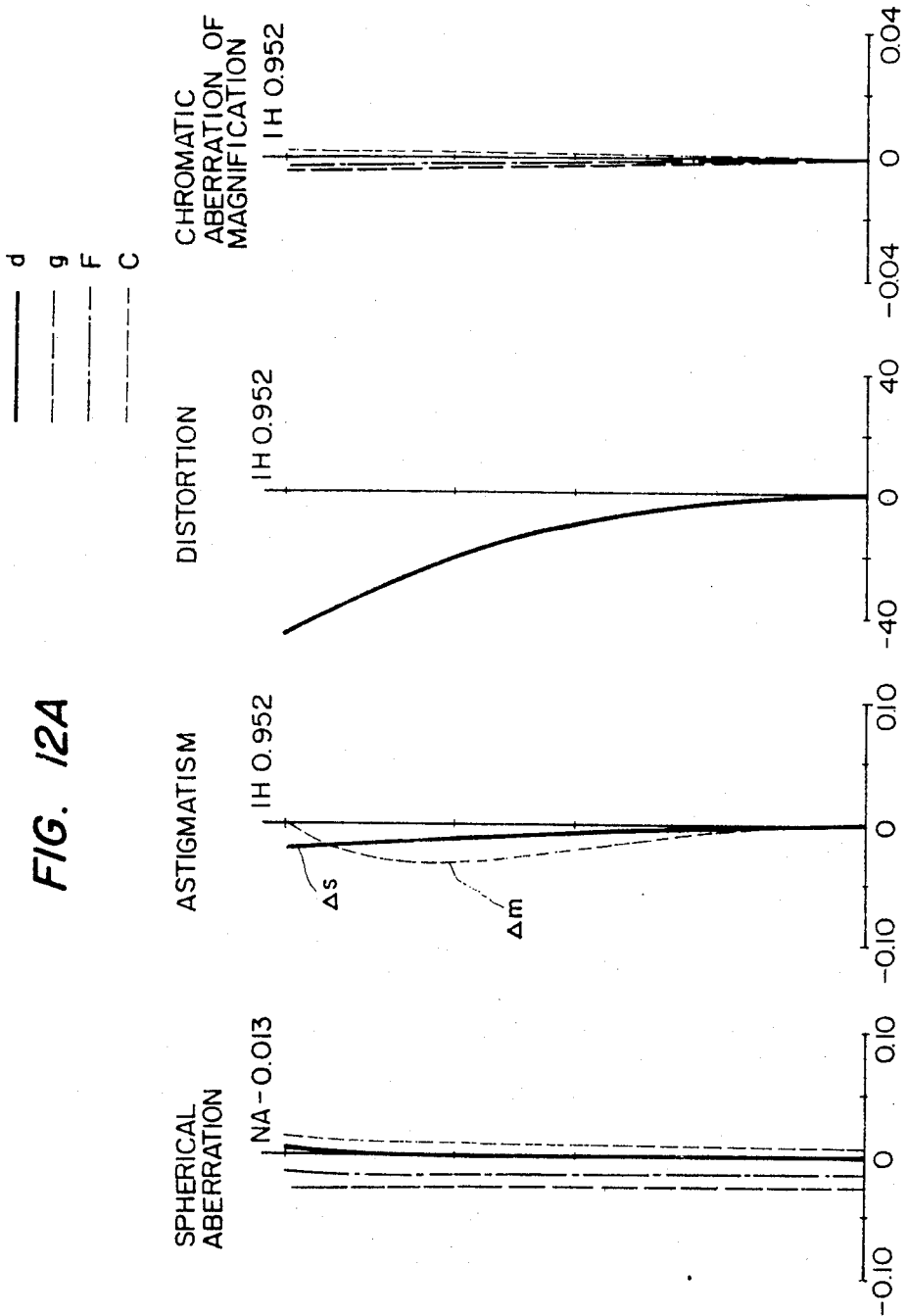
FIG. 12A and FIG. 12B show curves illustrating the aberration characteristics of an eleventh embodiment of the present invention.
Figure 12B:
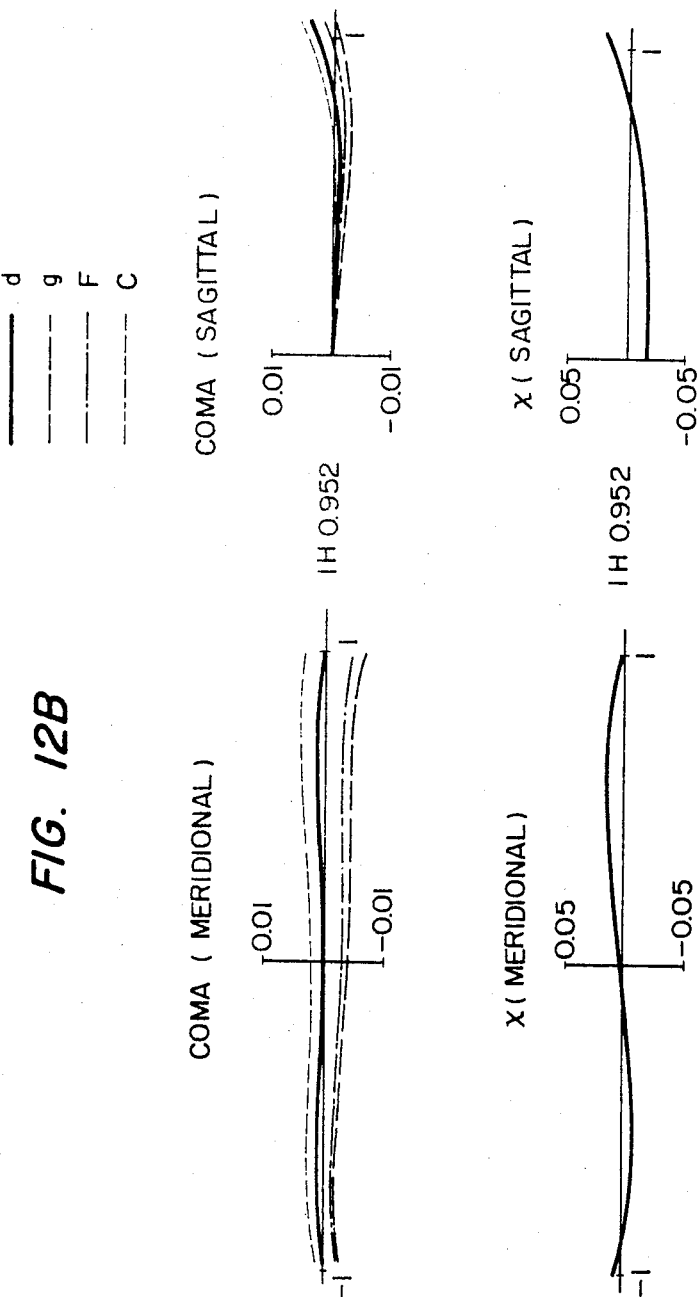

Now, numerical data will be described below as preferred embodiments of the objective for endoscopes according to the present invention.

| Embodiment 1 |
|---|
| f = 1.00, Position of object (Distance from first lens surface to object) 15.0, NA (Image side) = 0.016, Image height 0.952, Angle of view 2ω = 120.7° |

| | | | |
|---|---|---|---|
| $r_1 = 7.880$ | | | |
| | $d_1 = 0.404$ | $n_1 = 1.51633$ | $\nu_1 = 64.15$ |
| $r_2 = 0.530$ | | | |
| | $d_2 = 0.719$ | | |
| $s = \infty$ | | | |
| | $d_3 = 0.090$ | | |
| $r_3 = -6.338$ | | | |
| | $d_4 = 0.809$ | $n_2 = 1.58913$ | $\nu_2 = 61.11$ |
| $r_4 = -1.092$ | | | |
| | $d_5 = 0.503$ | | |
| $r_5 = 21.493$ | | | |
| | $d_6 = 0.764$ | $n_3 = 1.58913$ | $\nu_3 = 61.11$ |
| $r_6 = -2.923$ | | | |
| | $d_7 = 0.090$ | | |
| $r_7 = 2.329$ | | | |
| | $d_8 = 1.419$ | $n_4 = 1.618$ | $\nu_4 = 63.38$ |
| $r_8 = -1.616$ | | | |
| | $d_9 = 0.359$ | $n_5 = 1.84666$ | $\nu_5 = 23.9$ |
| $r_9 = 5.067$ | | | |
| | $d_{10} = 0.305$ | | |
| $r_{10} = 2.432$ | | | |
| | $d_{11} = 0.872$ | $n_6 = 1.51633$ | $\nu_6 = 64.15$ |

4,403,837

-continued

Embodiment 1
f = 1.00, Position of object (Distance from first lens surface to object) 15.0, NA (Image side) = 0.016, Image height 0.952, Angle of view 2ω = 120.7°

$r_{11} = \infty$

Embodiment 2
f = 1.00, Position of object 15.0, NA = 0.016, Image height 0.952, Angle of view 2ω = 121.6°

| | | | |
|---|---|---|---|
| $r_1 = 7.5033$ | | | |
| | $d_1 = 0.4$ | $n_1 = 1.51633$ | $v_1 = 64.15$ |
| $r_2 = 0.5318$ | | | |
| | $d_2 = 0.72$ | | |
| $s = \infty$ | | | |
| | $d_3 = 0.1$ | | |
| $r_3 = -6.0438$ | | | |
| | $d_4 = 0.81$ | $n_2 = 1.618$ | $v_2 = 63.38$ |
| $r_4 = -1.1286$ | | | |
| | $d_5 = 0.50$ | | |
| $r_5 = 28.6883$ | | | |
| | $d_6 = 0.76$ | $n_3 = 1.58913$ | $v_3 = 61.11$ |
| $r_6 = -2.9889$ | | | |
| | $d_7 = 0.1$ | | |
| $r_7 = 2.3414$ | | | |
| | $d_8 = 1.42$ | $n_4 = 1.618$ | $v_4 = 63.38$ |
| $r_8 = -1.6235$ | | | |
| | $d_9 = 0.36$ | $n_5 = 1.84666$ | $v_5 = 23.9$ |
| $r_9 = 5.725$ | | | |
| | $d_{10} = 0.31$ | | |
| $r_{10} = 2.3301$ | | | |
| | $d_{11} = 0.87$ | $n_6 = 1.51633$ | $v_6 = 64.15$ |
| $r_{11} = \infty$ | | | |

Embodiment 3
f = 1.00, Position of object 15.0, NA = 0.016, Image height 0.95, Angle of view 2ω = 116.06°

| | | | |
|---|---|---|---|
| $r_1 = 3.5625$ | | | |
| | $d_1 = 0.419$ | $n_1 = 1.58913$ | $v_1 = 60.97$ |
| $r_2 = 0.5554$ | | | |
| | $d_2 = 0.890$ | | |
| $s = \infty$ | | | |
| | $d_3 = 0.063$ | | |
| $r_3 = -3.2084$ | | | |
| | $d_4 = 0.827$ | $n_2 = 1.6968$ | $v_2 = 55.52$ |
| $r_4 = -1.2986$ | | | |
| | $d_5 = 0.094$ | | |
| $r_5 = 10.2262$ | | | |
| | $d_6 = 0.775$ | $n_3 = 1.6968$ | $v_3 = 55.52$ |
| $r_6 = -3.0521$ | | | |
| | $d_7 = 0.094$ | | |
| $r_7 = 3.1821$ | | | |
| | $d_8 = 1.454$ | $n_4 = 1.618$ | $v_4 = 36.38$ |
| $r_8 = -1.6720$ | | | |
| | $d_9 = 0.366$ | $n_5 = 1.84666$ | $v_5 = 23.9$ |
| $r_9 = 4.1180$ | | | |
| | $d_{10} = 0.3335$ | | |
| $r_{10} = 1.7073$ | | | |
| | $d_{11} = 1.297$ | $n_6 = 1.51633$ | $v_6 = 64.15$ |
| $r_{11} = \infty$ | | | |

Embodiment 4
f = 1.00, Position of object 15.0, NA = 0.016, Image height 0.95, Angle of view 2ω = 117.1°

| | | | |
|---|---|---|---|
| $r_1 = 3.6057$ | | | |
| | $d_1 = 0.419$ | $n_1 = 1.58913$ | $v_1 = 60.97$ |
| $r_2 = 0.5576$ | | | |
| | $d_2 = 0.89$ | | |
| $s = \infty$ | | | |
| | $d_3 = 0.063$ | | |
| $r_3 = -3.0774$ | | | |
| | $d_4 = 0.827$ | $n_2 = 1.6968$ | $v_2 = 55.52$ |
| $r_4 = -1.2991$ | | | |
| | $d_5 = 0.094$ | | |
| $r_5 = 11.2785$ | | | |
| | $d_6 = 0.775$ | $n_3 = 1.6968$ | $v_3 = 55.52$ |
| $r_6 = -3.1151$ | | | |
| | $d_7 = 0.094$ | | |
| $r_7 = 3.0399$ | | | |
| | $d_8 = 1.454$ | $n_4 = 1.618$ | $v_4 = 63.38$ |
| $r_8 = -1.6361$ | | | |
| | $d_9 = 0.366$ | $n_5 = 1.84666$ | $v_5 = 23.90$ |
| $r_9 = 4.3013$ | | | |
| | $d_{10} = 0.335$ | | |
| $r_{10} = 1.6852$ | | | |
| | $d_{11} = 1.297$ | $n_6 = 1.51633$ | $v_6 = 64.15$ |
| $r_{11} = \infty$ | | | |

Embodiment 5
f = 1.00, Position of object 15.0, NA = 0.015, Image height 0.95, Angle of view 2ω = 120.4°

| | | | |
|---|---|---|---|
| $r_1 = 3.3837$ | | | |
| | $d_1 = 0.405$ | $n_1 = 1.58913$ | $v_1 = 60.97$ |
| $r_2 = 0.5716$ | | | |
| | $d_2 = 0.702$ | | |
| $s = \infty$ | | | |
| | $d_3 = 0.219$ | | |
| $r_3 = -3.1061$ | | | |
| | $d_4 = 0.795$ | $n_2 = 1.6968$ | $v_2 = 55.52$ |
| $r_4 = -1.2540$ | | | |
| | $d_5 = 0.093$ | | |
| $r_5 = 10.5322$ | | | |
| | $d_6 = 0.748$ | $n_3 = 1.6968$ | $v_3 = 55.52$ |
| $r_6 = -2.9197$ | | | |
| | $d_7 = 0.093$ | | |
| $r_7 = 3.1383$ | | | |
| | $d_8 = 1.404$ | $n_4 = 1.618$ | $v_4 = 63.38$ |
| $r_8 = -1.6064$ | | | |
| | $d_9 = 0.351$ | $n_5 = 1.84666$ | $v_5 = 23.90$ |
| $r_9 = 4.0090$ | | | |
| | $d_{10} = 0.32$ | | |
| $r_{10} = 1.6384$ | | | |
| | $d_{11} = 1.06$ | $n_6 = 1.51633$ | $v_6 = 64.15$ |
| $r_{11} = \infty$ | | | |

Embodiment 6
f = 1.00, Position of object 15.0, NA = 0.015, Image height 0.95, Angle of view 2ω = 119.33°

| | | | |
|---|---|---|---|
| $r_1 = 3.7224$ | | | |
| | $d_1 = 0.4320$ | $n_1 = 1.58913$ | $v_1 = 60.97$ |
| $r_2 = 0.5756$ | | | |
| | $d_2 = 0.9396$ | | |
| $s = \infty$ | | | |
| | $d_3 = 0.0648$ | | |
| $r_3 = -3.1771$ | | | |
| | $d_4 = 0.8531$ | $n_2 = 1.69680$ | $v_2 = 55.52$ |
| $r_4 = -1.3412$ | | | |
| | $d_5 = 0.0972$ | | |
| $r_5 = 11.6435$ | | | |
| | $d_6 = 0.7991$ | $n_3 = 1.69680$ | $v_3 = 55.52$ |
| $r_6 = -3.2159$ | | | |
| | $d_7 = 0.0972$ | | |
| $r_7 = 2.8880$ | | | |
| | $d_8 = 1.4554$ | $n_4 = 1.56873$ | $v_4 = 63.16$ |
| $r_8 = -2.0529$ | | | |
| | $d_9 = 0.3780$ | $n_5 = 1.84666$ | $v_5 = 23.90$ |
| $r_9 = 4.4405$ | | | |
| | $d_{10} = 0.2592$ | | |
| $r_{10} = 1.7397$ | | | |
| | $d_{11} = 1.3391$ | $n_6 = 1.51633$ | $v_6 = 64.15$ |

-continued

Embodiment 6
f = 1.00, Position of object 15.0, NA = 0.015, Image height 0.95, Angle of view 2ω = 119.33°

$r_{11} = \infty$

Embodiment 7
f = 1.00, Position of object 15.0, NA = 0.015, Image height 0.95, Angle of view 2ω = 119°

| | | | |
|---|---|---|---|
| $r_1 = 3.7085$ | | | |
| | $d_1 = 0.4320$ | $n_1 = 1.58913$ | $\nu_1 = 60.97$ |
| $r_2 = 0.5761$ | | | |
| | $d_2 = 0.9396$ | | |
| $s = \infty$ | | | |
| | $d_3 = 0.0648$ | | |
| $r_3 = -3.3347$ | | | |
| | $d_4 = 0.8694$ | $n_2 = 1.72916$ | $\nu_2 = 54.68$ |
| $r_4 = -1.3946$ | | | |
| | $d_5 = 0.0972$ | | |
| $r_5 = 11.7853$ | | | |
| | $d_6 = 0.7991$ | $n_3 = 1.6968$ | $\nu_3 = 55.52$ |
| $r_6 = -3.2051$ | | | |
| | $d_7 = 0.0972$ | | |
| $r_7 = 2.9123$ | | | |
| | $d_8 = 1.4554$ | $n_4 = 1.56873$ | $\nu_4 = 63.16$ |
| $r_8 = -2.0518$ | | | |
| | $d_9 = 0.3780$ | $n_5 = 1.84666$ | $\nu_5 = 23.90$ |
| $r_9 = 4.4057$ | | | |
| | $d_{10} = 0.2592$ | | |
| $r_{10} = 1.7428$ | | | |
| | $d_{11} = 1.3391$ | $n_6 = 1.51633$ | $\nu_6 = 64.15$ |
| $r_{11} = \infty$ | | | |

Embodiment 8
f = 1.00, Position of object 15.0, NA = 0.015, Image height 0.95, Angle of view 2ω = 118.6°

| | | | |
|---|---|---|---|
| $r_1 = 3.7004$ | | | |
| | $d_1 = 0.4320$ | $n_1 = 1.58913$ | $\nu_1 = 60.97$ |
| $r_2 = 0.5749$ | | | |
| | $d_2 = 0.9397$ | | |
| $s = \infty$ | | | |
| | $d_3 = 0.649$ | | |
| $r_3 = -3.6000$ | | | |
| | $d_4 = 0.8694$ | $n_2 = 1.72916$ | $\nu_2 = 54.68$ |
| $r_4 = -1.3953$ | | | |
| | $d_5 = 0.0972$ | | |
| $r_5 = 12.7642$ | | | |
| | $d_6 = 0.7991$ | $n_3 = 1.69680$ | $\nu_3 = 55.52$ |
| $r_6 = -3.2224$ | | | |
| | $d_7 = 0.0972$ | | |
| $r_7 = 2.9300$ | | | |
| | $d_8 = 1.4554$ | $n_4 = 1.56873$ | $\nu_4 = 63.16$ |
| $r_8 = -2.0365$ | | | |
| | $d_9 = 0.3780$ | $n_5 = 1.84666$ | $\nu_5 = 23.90$ |
| $r_9 = 4.4767$ | | | |
| | $d_{10} = 0.2592$ | | |
| $r_{10} = 1.7276$ | | | |
| | $d_{11} = 1.3391$ | $n_6 = 1.51633$ | $\nu_6 = 64.15$ |
| $r_{11} = \infty$ | | | |

Embodiment 9
f = 1.00, Position of object 15.0, NA = 0.015, Image height 0.95, Angle of view 2ω = 118.2°

| | | | |
|---|---|---|---|
| $r_1 = 3.6949$ | | | |
| | $d_1 = 0.4320$ | $n_1 = 1.58913$ | $\nu_1 = 60.97$ |
| $r_2 = 0.5744$ | | | |
| | $d_2 = 0.9397$ | | |
| $s = \infty$ | | | |
| | $d_3 = 0.0649$ | | |
| $r_3 = -3.8000$ | | | |
| | $d_4 = 0.8695$ | $n_2 = 1.72916$ | $\nu_2 = 54.68$ |
| $r_4 = -1.3943$ | | | |
| | $d_5 = 0.0972$ | | |
| $r_5 = 13.3774$ | | | |
| | $d_6 = 0.7991$ | $n_3 = 1.6968$ | $\nu_3 = 55.52$ |
| $r_6 = -3.2318$ | | | |
| | $d_7 = 0.0972$ | | |
| $r_7 = 2.946$ | | | |
| | $d_8 = 1.4554$ | $n_4 = 1.56873$ | $\nu_4 = 63.16$ |
| $r_8 = -2.0291$ | | | |
| | $d_9 = 0.3780$ | $n_5 = 1.84666$ | $\nu_5 = 23.90$ |
| $r_9 = 4.5002$ | | | |
| | $d_{10} = 0.2592$ | | |
| $r_{10} = 1.7216$ | | | |
| | $d_{11} = 1.3391$ | $n_6 = 1.51633$ | $\nu_6 = 64.15$ |
| $r_{11} = \infty$ | | | |

Embodiment 10
f = 1.00, Position of object 15.0, NA = 0.011, Image height 0.9524, Angle of view 2ω = 122.44°

| | | | |
|---|---|---|---|
| $r_1 = 7.7302$ | | | |
| | $d_1 = 0.4043$ | $n_1 = 1.51633$ | $\nu_1 = 64.15$ |
| $r_2 = 0.5188$ | | | |
| | $d_2 = 0.7621$ | | |
| $s = \infty$ | | | |
| | $d_3 = 0.0397$ | | |
| $r_3 = -6.6228$ | | | |
| | $d_4 = 0.7935$ | $n_2 = 1.55963$ | $\nu_2 = 61.17$ |
| $r_4 = -1.1166$ | | | |
| | $d_5 = 0.5032$ | | |
| $r_5 = 15.3781$ | | | |
| | $d_6 = 0.7637$ | $n_3 = 1.58913$ | $\nu_3 = 61.11$ |
| $r_6 = -2.7664$ | | | |
| | $d_7 = 0.0898$ | | |
| $r_7 = 2.4021$ | | | |
| | $d_8 = 1.4196$ | $n_4 = 1.61800$ | $\nu_4 = 63.38$ |
| $r_8 = -1.6876$ | | | |
| | $d_9 = 0.3594$ | $n_5 = 1.84666$ | $\nu_5 = 23.9$ |
| $r_9 = 5.5004$ | | | |
| | $d_{10} = 0.3054$ | | |
| $r_{10} = 2.3814$ | | | |
| | $d_{11} = 1.020$ | $n_6 = 1.51633$ | $\nu_6 = 64.15$ |
| $r_{11} = \infty$ | | | |

Embodiment 11
f = 1.00, Position of object 15.0, NA = 0.0132, Image height 0.9524, Angle of view 2ω = 122.29°

| | | | |
|---|---|---|---|
| $r_1 = 7.6781$ | | | |
| | $d_1 = 0.4043$ | $n_1 = 1.51633$ | $\nu_1 = 64.15$ |
| $r_2 = 0.5196$ | | | |
| | $d_2 = 0.7126$ | | |
| $s = \infty$ | | | |
| | $d_3 = 0.0897$ | | |
| $r_3 = -5.9000$ | | | |
| | $d_4 = 0.7935$ | $n_2 = 1.55963$ | $\nu_2 = 61.17$ |
| $r_4 = -1.1033$ | | | |
| | $d_5 = 0.5032$ | | |
| $r_5 = 15.7023$ | | | |
| | $d_6 = 0.7637$ | $n_3 = 1.58913$ | $\nu_3 = 61.11$ |
| $r_6 = -2.7568$ | | | |
| | $d_7 = 0.0898$ | | |
| $r_7 = 2.4139$ | | | |
| | $d_8 = 1.4196$ | $n_4 = 1.61800$ | $\nu_4 = 63.38$ |
| $r_8 = -1.6849$ | | | |
| | $d_9 = 0.3594$ | $n_5 = 1.84666$ | $\nu_5 = 23.90$ |
| $r_9 = 5.4628$ | | | |
| | $d_{10} = 0.3054$ | | |
| $r_{10} = 2.3860$ | | | |
| | $d_{11} = 1.0200$ | $n_6 = 1.51633$ | $\nu_6 = 64.15$ |
| $r_{11} = \infty$ | | | | wherein the reference symbols $r_1$ through $r_{11}$ represent radii of curvature on the surfaces of the respective lens components, the reference symbol s represents stop, the reference symbols $d_1$ through $d_{11}$ represent thicknesses of the respective lens components and airspaces reserved therebetween (the reference symbol $d_2$ represents airspace reserved between the image side surface of the first lens component and the stop, the reference symbol $d_3$ represents airspace reserved between the stop and the image side surface of the second lens component.), the reference symbols $n_1$ through $n_6$ represent refractive indices of the respective lens components, the reference symbols $\nu_1$ through $\nu_6$ represent Abbe's numbers of the respective lens components, the reference symbol f represents focal length of the objective as a whole, and the reference symbol NA represents the numerical aperture of the objective.

I claim:

1. An objective for endoscopes comprising a first negative meniscus lens component having a convex surface on the object side, a second positive meniscus lens component having a concave surface on the object side, a third positive lens component, a fourth lens component consisting of a positive lens element and a negative lens element cemented to said positive lens element and a fifth positive lens component, said objective for endoscopes satisfying the following conditions:

(1) $r_3 \leq -3f$
(2) $-1.5 \leq r_6/r_7 \leq -0.5$
(3) $-4.0f \leq r_6 \leq -1.0f$
(4) $-3.0f < r_4 < -0.8f$
(5) $1.0f < |r_8| < 2.5f$
(6) $|n_4 - n_5| > 0.1$ wherein reference symbols $r_3$, $r_4$, $r_6$, $r_7$ and $r_8$ represent radii of curvature respectively of both surfaces of the second lens component, the surface on the image side of the third lens component and the surface on the object side and the cemented surface of the fourth lens component, reference symbols $n_4$ and $n_5$ represent respective refractive indices of both lens element of the fourth lens component, and reference symbol f represents a focal length of the entire system.

2. An objective for endoscopes according to claim 1 wherein said fifth lens component is a plano-convex lens.

3. An objective for endoscopes according to claim 2 wherein said objective for endoscopes further comprises an image transmitting fiber bundle cemented in its light incidence end surface to the plane surface of said fifth lens component.

4. An objective for endoscopes according to claim 1 having the following numerical data:

f=1.00, Position of object (Distance from first lens surface to object) 15.0, NA (Image side)=0.016, Image height 0.952, Angle of view $2\omega=120.7°$

| | | | |
|---|---|---|---|
| $r_1 = 7.880$ | | | |
| | $d_1 = 0.404$ | $n_1 = 1.51633$ | $\nu_1 = 64.15$ |
| $r_2 = 0.530$ | | | |
| | $d_2 = 0.719$ | | |
| $s = \infty$ | | | |
| | $d_3 = 0.090$ | | |
| $r_3 = -6.338$ | | | |
| | $d_4 = 0.809$ | $n_2 = 1.58913$ | $\nu_2 = 61.11$ |
| $r_4 = -1.092$ | | | |
| | $d_5 = 0.503$ | | |
| $r_5 = 21.493$ | | | |
| | $d_6 = 0.764$ | $n_3 = 1.58913$ | $\nu_3 = 61.11$ |
| $r_6 = -2.923$ | | | |
| $r_7 = 2.329$ | $d_7 = 0.090$ | | |
| | $d_8 = 1.419$ | $n_4 = 1.618$ | $\nu_4 = 63.38$ |
| $r_8 = -1.616$ | | | |
| | $d_9 = 0.359$ | $n_5 = 1.84666$ | $\nu_5 = 23.9$ |
| $r_9 = 5.067$ | | | |
| | $d_{10} = 0.305$ | | |
| $r_{10} = 2.432$ | | | |
| | $d_{11} = 0.872$ | $n_6 = 1.51633$ | $\nu_6 = 64.15$ |
| $r_{11} = \infty$ | | | | wherein the reference symbols $r_1$ through $r_{11}$ represent radii of curvature on the surfaces of the respective lens components, the reference symbol s represents stop, the reference symbols $d_1$ through $d_{11}$ represent thicknesses of the respective lens components and airspaces reserved therebetween (the reference symbol $d_2$ represents airspace reserved between the image side surface of the first lens component and the stop, the reference symbol $d_3$ represents airspace reserved between the stop and the image side surface of the second lens component.), the reference symbols $n_1$ through $n_6$ represent refractive indices of the respective lens components, the reference symbols $\nu_1$ through $\nu_6$ represent Abbe's numbers of the respective lens components, the reference symbol f represents focal length of the objective as a whole, and the reference symbol NA represent the numerical aperture of the objective.

5. An objective for endoscopes according to claim 1 having the following numerical data:

f=1.00, Position of object 15.0, NA=0.016, Image height 0.952, Angle of view $2\omega=121.6°$

| | | | |
|---|---|---|---|
| $r_1 = 7.5033$ | | | |
| | $d_1 = 0.4$ | $n_1 = 1.51633$ | $\nu_1 = 64.15$ |
| $r_2 = 0.5318$ | | | |
| | $d_2 = 0.72$ | | |
| $s = \infty$ | | | |
| | $d_3 = 0.1$ | | |
| $r_3 = -6.0438$ | | | |
| | $d_4 = 0.81$ | $n_2 = 1.618$ | $\nu_2 = 63.38$ |
| $r_4 = -1.1286$ | | | |
| | $d_5 = 0.50$ | | |
| $r_5 = 28.6883$ | | | |
| | $d_6 = 0.76$ | $n_3 = 1.58913$ | $\nu_3 = 61.11$ |
| $r_6 = -2.9889$ | | | |
| | $d_7 = 0.1$ | | |
| $r_7 = 2.3414$ | | | |
| | $d_8 = 1.42$ | $n_4 = 1.618$ | $\nu_4 = 63.38$ |
| $r_8 = -1.6235$ | | | |
| | $d_9 = 0.36$ | $n_5 = 1.84666$ | $\nu_5 = 23.9$ |
| $r_9 = 5.725$ | | | |
| | $d_{10} = 0.31$ | | |
| $r_{10} = 2.3301$ | | | |
| | $d_{11} = 0.87$ | $n_6 = 1.51633$ | $\nu_6 = 64.15$ |
| $r_{11} = \infty$ | | | | wherein the reference symbols $r_1$ through $r_{11}$ represent radii of curvature on the surfaces of the respective lens components, the reference symbol s represents stop, the reference symbols $d_1$ through $d_{11}$ represent thicknesses of the respective lens components and airspaces reserved therebetween (the reference symbol $d_2$ represents airspace reserved between the image side surface of the first lens component and the stop, the reference symbol $d_3$ represent airspace reserved between the stop and the image side surface of the second lens component.), the reference symbols $n_1$ through $n_6$ represent refractive indices of the respective lens components, the reference symbols $\nu_1$ through $\nu_6$ represent Abbe's numbers of the respective lens components, the reference symbol f represents focal length of the objective as a whole, and the reference symbol NA represent the numerical aperture of the objective.

6. An objective for endoscopes according to claim 1 having the following numerical data:

f=1.00, Position of Object 15.0, NA=0.016, Image height 0.95, Angle of view 2ω=116.06°

| | | | |
|---|---|---|---|
| $r_1 = 3.5625$ | | | |
| | $d_1 = 0.419$ | $n_1 = 1.58913$ | $v_1 = 60.97$ |
| $r_2 = 0.5554$ | | | |
| | $d_2 = 0.890$ | | |
| $s = \infty$ | | | |
| | $d_3 = 0.0063$ | | |
| $r_3 = -3.2084$ | | | |
| | $d_4 = 0.827$ | $n_2 = 1.6968$ | $v_2 = 55.52$ |
| $r_4 = -1.2986$ | | | |
| | $d_5 = 0.094$ | | |
| $r_5 = 10.2262$ | | | |
| | $d_6 = 0.775$ | $n_3 = 1.6968$ | $v_3 = 55.52$ |
| $r_6 = -3.0521$ | | | |
| | $d_7 = 0.094$ | | |
| $r_7 = 3.1821$ | | | |
| | $d_8 = 1.454$ | $n_4 = 1.618$ | $v_4 = 36.38$ |
| $r_8 = -1.6720$ | | | |
| | $d_9 = 0.366$ | $n_5 = 1.84666$ | $v_5 = 23.9$ |
| $r_9 = 4.1180$ | | | |
| | $d_{10} = 0.3335$ | | |
| $r_{10} = 1.7073$ | | | |
| | $d_{11} = 1.297$ | $n_6 = 1.51633$ | $v_6 = 64.15$ |
| $r_{11} = \infty$ | | | | wherein the reference symbols $r_1$ through $r_{11}$ represent radii of curvature on the surfaces of the respective lens component, the reference symbol s represents stop, the reference symbols $d_1$ through $d_{11}$ represent thicknesses of the respective lens components and airspaces reserved therebetween (the reference symbol $d_2$ represents airspace reserved between the image side surface of the first lens component and the stop, the reference symbol $d_3$ represents airspace reserved between the top and the image side surface of the second lens component.), the reference symbols $n_1$ through $n_6$ represent refractive indices of the respective lens components, the reference symbols $v_1$ through $v_6$ represent Abbe's numbers of the respective lens components, the reference symbol f represents focal length of the objective as a whole, and the reference symbol NA represent the numerical aperture of the objective.

7. An objective for endoscopes according to claim 1 having the following numerical data:

f=1.00, Position of object 15.0, NA=0.016, Image height 0.95, Angle of view 2ω=117.1°

| | | | |
|---|---|---|---|
| $r_1 = 3.6057$ | | | |
| | $d_1 = 0.419$ | $n_1 = 1.58913$ | $v_1 = 60.97$ |
| $r_2 = 0.5576$ | | | |
| | $d_2 = 0.89$ | | |
| $s = \infty$ | | | |
| | $d_3 = 0.063$ | | |
| $r_3 = -3.0774$ | | | |
| | $d_4 = 0.827$ | $n_2 = 1.6968$ | $v_2 = 55.52$ |
| $r_4 = -1.2991$ | | | |
| | $d_5 = 0.094$ | | |
| $r_5 = 11.2785$ | | | |
| | $d_6 = 0.775$ | $n_3 = 1.6968$ | $v_3 = 55.52$ |
| $r_6 = -3.1151$ | | | |
| | $d_7 = 0.094$ | | |
| $r_7 = 3.0399$ | | | |
| | $d_8 = 1.454$ | $n_4 = 1.618$ | $v_4 = 63.38$ |
| $r_8 = -1.6361$ | | | |
| | $d_9 = 0.366$ | $n_5 = 1.84666$ | $v_5 = 23.90$ |
| $r_9 = 4.3013$ | | | |
| | $d_{10} = 0.335$ | | |
| $r_{10} = 1.6852$ | | | |
| | $d_{11} = 1.297$ | $n_6 = 1.51633$ | $v_6 = 64.15$ |
| $r_{11} = \infty$ | | | | wherein the reference symbols $r_1$ through $r_{11}$ represent radii or curvature on the surfaces of the respective lens components, the reference symbol s represents stop, the reference symbols $d_1$ through $d_{11}$ represent thicknesses of the respective lens components and airspaces reserved therebetween (the reference symbol $d_2$ represents airspace reserved between the image side surface of the first lens component and the stop, the reference symbol $d_3$ represents airspace reserved between the stop and the image side surface of the second lens component.), the reference symbols $n_1$ through $n_6$ represent refractive indices of the respective lens components, the reference symbols $v_1$ through $v_6$ represent Abbe's numbers of the respective lens components, the reference symbol f represents focal length of the objective as a whole, and the reference symbol NA represent the numerical aperture of the objective.

8. An objective for endoscopes according to claim 1 having the following numerical data:

f=1.00, Position of Object 15.0, NA=0.015, Image height 0.95, Angle of view 2ω=120.4°

| | | | |
|---|---|---|---|
| $r_1 = 3.3837$ | | | |
| | $d_1 = 0.405$ | $n_1 = 1.58913$ | $v_1 = 60.97$ |
| $r_2 = 0.5716$ | | | |
| | $d_2 = 0.702$ | | |
| $s = \infty$ | | | |
| | $d_3 = 0.219$ | | |
| $r_3 = -3.1061$ | | | |
| | $d_4 = 0.795$ | $n_2 = 1.6968$ | $v_2 = 55.52$ |
| $r_4 = -1.2540$ | | | |
| | $d_5 = 0.093$ | | |
| $r_5 = 10.5322$ | | | |
| | $d_6 = 0.748$ | $n_3 = 1.6968$ | $v_3 = 55.52$ |
| $r_6 = -2.9197$ | | | |
| | $d_7 = 0.093$ | | |
| $r_7 = 3.1383$ | | | |
| | $d_8 = 1.404$ | $n_4 = 1.618$ | $v_4 = 63.48$ |
| $r_8 = -1.6064$ | | | |
| | $d_9 = 0.351$ | $n_5 = 1.84666$ | $v_5 = 23.90$ |
| $r_9 = 4.0090$ | | | |
| | $d_{10} = 0.32$ | | |
| $r_{10} = 1.6384$ | | | |
| | $d_{11} = 1.06$ | $n_6 = 1.51633$ | $v_6 = 64.15$ |
| $r_{11} = \infty$ | | | | wherein the reference symbols $r_1$ through $r_{11}$ represent radii of curvature on the surfaces of the respective lens components, the reference symbol s represents stop, the reference symbols $d_1$ through $d_{11}$ represent thicknesses of the respective lens components and airspaces reserved therebetween (the reference symbol $d_2$ represents airspaces reserved between the image side surface of the first lens component and the stop, the reference symbol $d_3$ represent airspace reserved between the stop and the image side surface of the second lens component.), the reference symbols $n_1$ through $n_6$ represent refractive indices of the respective lens components, the reference symbols $v_1$ through $v_6$ represent Abbe's numbers of the respective lens components, the reference symbol f represents focal length of the objective as a whole, and the reference symbol NA represent the numerical aperture of the objective.

9. An objective for endoscopes according to claim 1 having the following numerical data:

f=1.00, Position of object 15.0, NA=0.015, Image height 0.95, Angle of view 2ω=119.33°.

| | | | |
|---|---|---|---|
| $r_1 = 3.7224$ | | | |
| | $d_1 = 0.4320$ | $n_1 = 1.58913$ | $\nu_1 = 60.97$ |
| $r_2 = 0.5756$ | | | |
| | $d_2 = 0.9396$ | | |
| $s = \infty$ | | | |
| | $d_3 = 0.0648$ | | |
| $r_3 = -3.1771$ | | | |
| | $d_4 = 0.8531$ | $n_2 = 1.69680$ | $\nu_2 = 55.52$ |
| $r_4 = -1.3412$ | | | |
| | $d_5 = 0.0972$ | | |
| $r_5 = 11.6435$ | | | |
| | $d_6 = 0.7991$ | $n_3 = 1.69680$ | $\nu_3 = 55.52$ |
| $r_6 = -3.2159$ | | | |
| | $d_7 = 0.0972$ | | |
| $r_7 = 2.8880$ | | | |
| | $d_8 = 1.4554$ | $n_4 = 1.56873$ | $\nu_4 = 63.16$ |
| $r_8 = -2.0529$ | | | |
| | $d_9 = 0.3780$ | $n_5 = 1.84666$ | $\nu_5 = 23.90$ |
| $r_9 = 4.4405$ | | | |
| | $d_{10} = 0.2592$ | | |
| $r_{10} = 1.7397$ | | | |
| | $d_{11} = 1.3391$ | $n_6 = 1.51633$ | $\nu_6 = 64.15$ |
| $r_{11} = \infty$ | | | | wherein the reference symbols $r_1$ through $r_{11}$ represent radii of curvature on the surfaces of the respective lens components, the reference symbol s represents stop, the reference symbols $d_1$ through $d_{11}$ represent thicknesses of the respective lens components and airspaces reserved therebetween (the reference symbol $d_2$ represents airspace reserved between the image side surface of the first lens component and the stop, the reference symbol $d_3$ represents airspace reserved between the stop and the image side surface on the second lens component.), the reference symbols $n_1$ through $n_6$ represent refractive indices of the respective lens components, the reference symbols $\nu_1$ through $\nu_6$ represent Abbe's numbers of the respective lens components, the reference symbol f represents focal length of the objective as a whole, and the reference symbol NA represent the numerical aperture of the objective.

10. An objective endoscopes according to claim 1 having the following numerical data:

f=1.00, Position of object 15.0, NA=0.015, Image height 0.95, Angle of view 2ω=119°

| | | | |
|---|---|---|---|
| $r_1 = 3.7085$ | | | |
| | $d_1 = 0.4320$ | $n_1 = 1.58913$ | $\nu_1 = 60.97$ |
| $r_2 = 0.5761$ | | | |
| | $d_2 = 0.9396$ | | |
| $s = \infty$ | | | |
| | $d_3 = 0.0648$ | | |
| $r_3 = -3.3347$ | | | |
| | $d_4 = 0.8694$ | $n_2 = 1.72916$ | $\nu_2 = 54.68$ |
| $r_4 = -1.3946$ | | | |
| | $d_5 = 0.0972$ | | |
| $r_5 = 11.7853$ | | | |
| | $d_6 = 0.7991$ | $n_3 = 1.6968$ | $\nu_3 = 55.52$ |
| $r_6 = -3.2051$ | | | |
| | $d_7 = 0.0972$ | | |
| $r_7 = 2.9123$ | | | |
| | $d_8 = 1.4554$ | $n_4 = 1.56873$ | $\nu_4 = 63.16$ |
| $r_8 = -2.0518$ | | | |
| | $d_9 = 0.3780$ | $n_5 = 1.84666$ | $\nu_5 = 23.90$ |
| $r_9 = 4.4057$ | | | |
| | $d_{10} = 0.2592$ | | |
| $r_{10} = 1.7428$ | | | |
| | $d_{11} = 1.3391$ | $n_6 = 1.51633$ | $\nu_6 = 64.15$ |
| $r_{11} = \infty$ | | | | wherein the reference symbols $r_1$ through $r_{11}$ represent radii of curvature on the surfaces of the respective lens components, the reference symbol s represents stop, the reference symbols $d_1$ through $d_{11}$ represent thicknesses of the respective lens components and airspaces reserved therebetween (the reference symbol $d_2$ represents airspace reserved between the image side surface of the first lens component and the stop, the reference symbol $d_3$ represents airspace reserved between the stop and the image side surface of the second lens component.), the reference symbols $n_1$ through $n_6$ represent refractive indices of the respective lens components, the reference symbols $\nu_1$ through $\nu_6$ represent Abbe's numbers of the respective lens components, the reference symbol f represents focal length of the objective as a whole, and the reference symbol NA represent the numerical aperture of the objective.

11. An objective for endoscopes according to claim 1 having the following numerical data:

f=1.00, Position of object 15.0, NA=0.015, Image height 0.95, Angle of view 2ω=118.6°

| | | | |
|---|---|---|---|
| $r_1 = 3.7004$ | | | |
| | $d_1 = 0.4320$ | $n_1 = 1.58913$ | $\nu_1 = 60.97$ |
| $r_2 = 0.5749$ | | | |
| | $d_2 = 0.9397$ | | |
| $s = \infty$ | | | |
| | $d_3 = 0.649$ | | |
| $r_3 = -3.6000$ | | | |
| | $d_4 = 0.8694$ | $n_2 = 1.72916$ | $\nu_2 = 54.68$ |
| $r_4 = -1.3953$ | | | |
| | $d_5 = 0.0972$ | | |
| $r_5 = 12.7642$ | | | |
| | $d_6 = 0.7991$ | $n_3 = 1.69680$ | $\nu_3 = 55.52$ |
| $r_6 = -3.2224$ | | | |
| | $d_7 = 0.0972$ | | |
| $r_7 = 2.9300$ | | | |
| | $d_8 = 1.4554$ | $n_4 = 1.56873$ | $\nu_4 = 63.16$ |
| $r_8 = -2.0365$ | | | |
| | $d_9 = 0.3780$ | $n_5 = 1.84666$ | $\nu_5 = 23.90$ |
| $r_9 = 4.4767$ | | | |
| | $d_{10} = 0.2592$ | | |
| $r_{10} = 1.7276$ | | | |
| | $d_{11} = 1.3391$ | $n_6 = 1.51633$ | $\nu_6 = 64.15$ |
| $r_{11} = \infty$ | | | | wherein the reference symbols $r_1$ through $r_{11}$ represent radii of curvature on the surfaces of the respective lens components, the reference symbol s represents stop, the reference symbols $d_1$ through $d_{11}$ represent thicknesses of the respective lens components and airspaces reserved therebetween (the reference symbol $d_2$ represents airspace reserved between the image side surface of the first lens component and the stop, the reference symbol $d_3$ represents airspace reserved between the stop and the image side surface of the second lens component.), the reference symbols $n_1$ through $n_6$ represent refractive indices of the respective lens components, the reference symbols $\nu_1$ through $\nu_6$ represent Abbe's numbers of the respective lens components, the reference symbol f represents focal length of the objective as a whole, and the reference symbol NA represent the numerical aperture of the objective.

12. An objective for endoscopes according to claim 1 having the following numerical data:

f=1.00, Position of object 15.0, NA=0.015, Image height 0.95, Angle of view 2ω=118.2°

| | | | |
|---|---|---|---|
| $r_1 = 3.6949$ | | | |
| | $d_1 = 0.4320$ | $n_1 = 1.58913$ | $\nu_1 = 60.97$ |
| $r_2 = 0.5744$ | | | |
| | $d_2 = 0.9397$ | | |
| $s = \infty$ | | | |

-continued

| | | | |
|---|---|---|---|
| $r_3 = -3.8000$ | $d_3 = 0.0649$ | | |
| $r_4 = -1.3943$ | $d_4 = 0.8695$ | $n_2 = 1.72916$ | $\nu_2 = 54.68$ |
| $r_5 = 13.3774$ | $d_5 = 0.0972$ | | |
| $r_6 = -3.2318$ | $d_6 = 0.7991$ | $n_3 = 1.6968$ | $\nu_3 = 55.52$ |
| $r_7 = 2.946$ | $d_7 = 0.0972$ | | |
| $r_8 = -2.0291$ | $d_8 = 1.4554$ | $n_4 = 1.56873$ | $\nu_4 = 63.16$ |
| $r_9 = 4.5002$ | $d_9 = 0.3780$ | $n_5 = 1.84666$ | $\nu_5 = 23.90$ |
| $r_{10} = 1.7216$ | $d_{10} = 0.2592$ | | |
| $r_{11} = \infty$ | $d_{11} = 1.3391$ | $n_6 = 1.51633$ | $\nu_6 = 64.15$ | wherein the reference symbols $r_1$ through $r_{11}$ represent radii of curvature on the surfaces of the respective lens components, the reference symbol s represents stop, the reference symbols $d_1$ through $d_{11}$ represent thicknesses of the respective lens components and airspaces reserved therebetween (the reference symbol $d_2$ represents airspace reserved between the image side surface of the first lens component and the stop, the reference symbol $d_3$ represents airspace reserved between the stop and the image side surface of the second lens component.), the reference symbols $n_1$ through $n_6$ represent refractive indices of the respective lens components, the reference symbols $\nu_1$ through $\nu_6$ represent Abbe's numbers of the respective lens components, the reference symbol f represents focal length of the objective as a whole, and the reference symbol NA represent the numerical aperture of the objective.

13. An objective for endoscopes according to claim 1 having the following numerical data:

f=1.00, Position of object 15.0, NA=0.011, Image height 0.9524, Angle of view $2\omega=122.44°$

| | | | |
|---|---|---|---|
| $r_1 = 7.7302$ | $d_1 = 0.4043$ | $n_1 = 1.51633$ | $\nu_1 = 64.15$ |
| $r_2 = 0.5188$ | $d_2 = 0.7621$ | | |
| $s = \infty$ | $d_3 = 0.0397$ | | |
| $r_3 = -6.6228$ | $d_4 = 0.7935$ | $n_2 = 1.55963$ | $\nu_2 = 61.17$ |
| $r_4 = -1.1166$ | $d_5 = 0.5032$ | | |
| $r_5 = 15.3781$ | $d_6 = 0.7637$ | $n_3 = 1.58913$ | $\nu_3 = 61.11$ |
| $r_6 = -2.7664$ | $d_7 = 0.0898$ | | |
| $r_7 = 2.4021$ | $d_8 = 1.4196$ | $n_4 = 1.61800$ | $\nu_4 = 63.38$ |
| $r_8 = -1.6876$ | $d_9 = 0.3594$ | $n_5 = 1.84666$ | $\nu_5 = 23.9$ |
| $r_9 = 5.5004$ | $d_{10} = 0.3054$ | | |
| $r_{10} = 2.3814$ | $d_{11} = 1.020$ | $n_6 = 1.51633$ | $\nu_6 = 64.15$ |
| $r_{11} = \infty$ | | | | wherein the reference symbols $r_1$ through $r_{11}$ represent radii of curvature on the surfaces of the respective lens components, the reference symbol s represents stop, the reference symbols $d_1$ through $d_{11}$ represent thicknesses of the respective lens components and airspaces reserved therebetween (the reference symbol $d_2$ represents airspace reserved between the image side surface of the first lens component and the stop, the reference symbol $d_3$ represent airspace reserved between the stop and the image side surface of the second lens component.), the reference symbols $n_1$ through $n_6$ represent refractive indices of the respective lens components, the reference symbols $\nu_1$ through $\nu_6$ represent Abbe's numbers of the respective lens components, the reference symbol f represents focal length of the objective as a whole, and the reference symbol NA represent the numerical aperture of the objective.

14. An objective for endoscopes according to claim 1 having the following numerical data:

f=1.00, Position of object 15.0, NA=0.0132, Image height 0.9524, Angle of view $2\omega=122.29°$

| | | | |
|---|---|---|---|
| $r_1 = 7.6781$ | $d_1 = 0.4043$ | $n_1 = 1.51633$ | $\nu_1 = 64.15$ |
| $r_2 = 0.5196$ | $d_2 = 0.7126$ | | |
| $s = \infty$ | $d_3 = 0.0897$ | | |
| $r_3 = -5.9000$ | $d_4 = 0.7935$ | $n_2 = 1.55963$ | $\nu_2 = 61.17$ |
| $r_4 = -1.1033$ | $d_5 = 0.5032$ | | |
| $r_5 = 15.7023$ | $d_6 = 0.7637$ | $n_3 = 1.58913$ | $\nu_3 = 61.11$ |
| $r_6 = -2.7568$ | $d_7 = 0.0898$ | | |
| $r_7 = 2.4139$ | $d_8 = 1.4196$ | $n_4 = 1.61800$ | $\nu_4 = 63.38$ |
| $r_8 = -1.6849$ | $d_9 = 0.3594$ | $n_5 = 1.84666$ | $\nu_5 = 23.90$ |
| $r_9 = 5.4628$ | $d_{10} = 0.3054$ | | |
| $r_{10} = 2.3860$ | $d_{11} = 1.0200$ | $n_6 = 1.51633$ | $\nu_6 = 64.15$ |
| $r_{11} = \infty$ | | | | wherein the reference symbols $r_1$ through $r_{11}$ represent radii of curvature on the surfaces of the respective lens components, the reference symbol s represents stop, the reference symbols $d_1$ through $d_{11}$ represent thicknesses of the respective lens components and airspaces reserved therebetween (the reference symbol $d_2$ represents airspace reserved between the image side surface of the first lens component and the stop, the reference symbol $d_3$ represents airspace reserved between the stop and the image side surface of the second lens component.), the reference symbols $n_1$ through $n_6$ represent refractive indices of the respective lens components, the reference symbols $\nu_1$ through $\nu_6$ represent Abbe's numbers of the respective lens components, the reference symbol f represents focal length of the objective as a whole, and the reference symbol NA represent the numerical aperture of the objective.

* * * * *